(12) United States Patent
Fujiwara et al.

(10) Patent No.: US 9,116,292 B2
(45) Date of Patent: Aug. 25, 2015

(54) OPTICAL WAVEGUIDE MODULE, METHOD FOR PRODUCING OPTICAL WAVEGUIDE MODULE, AND ELECTRONIC APPARATUS

(75) Inventors: Makoto Fujiwara, Utsunomiya (JP); Motoya Kaneta, Utsunomiya (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 47 days.

(21) Appl. No.: 13/824,766

(22) PCT Filed: Sep. 22, 2011

(86) PCT No.: PCT/JP2011/071738
§ 371 (c)(1),
(2), (4) Date: Mar. 18, 2013

(87) PCT Pub. No.: WO2012/043417
PCT Pub. Date: Apr. 5, 2012

(65) Prior Publication Data
US 2013/0182997 A1   Jul. 18, 2013

(30) Foreign Application Priority Data
Oct. 1, 2010 (JP) .................................. 2010-224411

(51) Int. Cl.
*G02B 6/12* (2006.01)
*G02B 6/42* (2006.01)

(52) U.S. Cl.
CPC .......... *G02B 6/12004* (2013.01); *G02B 6/4214* (2013.01)

(58) Field of Classification Search
CPC ......... G02B 6/12; G02B 6/12004; G02B 6/00
USPC .................................................... 385/14, 131
See application file for complete search history.

(56) References Cited

U.S. PATENT DOCUMENTS 7,120,325 B1 * 10/2006 Uchida ............................ 385/14

8,076,782 B2 * 12/2011 Asai et al. ...................... 257/774
(Continued)

FOREIGN PATENT DOCUMENTS

| CN | 101535852 A | 9/2009 |
| JP | 2005 294407 | 10/2005 |

(Continued)

OTHER PUBLICATIONS

International Search Report Issued Nov. 1, 2011 in PCT/JP11/71738 Filed Sep. 22, 2011.

(Continued)

*Primary Examiner* — Kaveh Kianni
(74) *Attorney, Agent, or Firm* — Oblon, McClelland, Maier & Neustadt, L.L.P.

(57) ABSTRACT

An object of the present invention is to provide an optical waveguide module which has a small optical coupling loss between the light element and the optical waveguide and can perform high-quality optical communication, a method for producing the optical waveguide module with high efficiency, and an electronic apparatus which includes the optical waveguide module and can perform high-quality optical communication, and the present invention provides an optical waveguide module including: an optical waveguide including a core portion, a clad portion that is provided to cover a side surface of the core portion, and an optical path-converting unit that is provided partway along the core portion or on an extended line of the core portion and that converts an optical path of the core portion to the outside of the clad portion; an optical element that is provided over the clad portion; a circuit board that is provided between the optical waveguide and the optical element and has a through-hole formed along an optical path connecting between the optical path-converting unit and the optical element; and a sealing portion that is transparent and is formed in a gap between the optical element and the circuit board; wherein a part of the sealing portion is inserted into the through-hole, and an inserted portion of the sealing portion functions as a lens for converging signal light passing though the optical path.

20 Claims, 11 Drawing Sheets

(56) References Cited

U.S. PATENT DOCUMENTS

| | | |
|---|---|---|
| 2006/0012967 A1* | 1/2006 | Asai et al. .................... 361/764 |
| 2006/0210213 A1 | 9/2006 | Huang et al. |
| 2009/0010591 A1* | 1/2009 | Iwamori et al. ................ 385/14 |
| 2009/0180732 A1 | 7/2009 | Takai et al. |
| 2010/0232744 A1* | 9/2010 | Asai et al. ...................... 385/14 |

FOREIGN PATENT DOCUMENTS

| | | |
|---|---|---|
| JP | 2008 216712 | 9/2008 |
| JP | 2009 14859 | 1/2009 |
| JP | 2009 163178 | 7/2009 |

OTHER PUBLICATIONS

Combined Chinese Office Action and Search Report issued Oct. 10, 2014 in Application No. 201180046191.X (with partial English language translation).

* cited by examiner

OPTICAL WAVEGUIDE MODULE, METHOD FOR PRODUCING OPTICAL WAVEGUIDE MODULE, AND ELECTRONIC APPARATUS

TECHNICAL FIELD

The present invention relates to an optical waveguide module, a method for producing the optical waveguide module, and an electronic apparatus.

This application claims priority to and the benefit of Japanese Patent Application No. 2010-224411 filed on Oct. 1, 2010, the contents of which are incorporated herein by reference.

BACKGROUND ART

In recent years, along with the wave of informatization, the prevalence of broadband lines (broadband), which are capable of communicating large-capacity information at high speed, has increased. In addition, as transmission apparatuses that transmit information to this broadband line, a router apparatus, a WDM (Wavelength Division Multiplexing) apparatus, and the like have been used. A plurality of signal-processing boards, in which a computing device such as an LSI, a storage device such as a memory, and the like are combined, are provided in the transmitting apparatuses and function to mutually connect respective lines.

A circuit, in which the computing device, the storage device, and the like are connected through an electrical connection, is provided in the respective signal-processing boards. However, in recent years, accompanying an increase in the amount of information that is processed, it is required for each substrate to transmit information at a significantly high throughput. However, accompanying an increase in speed of information transmission, problems such as crosstalk or high-frequency noise, and deterioration of an electrical signal have occurred. Therefore, a bottleneck occurs in the electrical interconnection, and thus it is difficult to improve the throughput of the signal-processing substrate. In addition, the same problems occur in supercomputers, large-scale servers, or the like.

On the other hand, an optical communication technique that transmits data using an optical carrier wave has been developed, and an optical waveguide has been developed as means for guiding the optical carrier wave from one point to another point. This optical waveguide includes a linear core portion and a clad portion that is provided to cover the periphery of the core portion. The core portion is formed from a material that is substantially transparent with respect to light of the optical carrier wave. The clad portion is formed from a material with a refractive index lower than that of the core portion.

In the optical waveguide, light that is incident from one end of the core portion is conveyed to the other end thereof while being reflected at the boundary with the clad portion. A light-emitting element such as a semiconductor laser is disposed on an incidence side of the optical waveguide. A light-receiving element such as a photodiode is disposed on an output side. Light that is incident from the light-emitting element propagates through the optical waveguide and is received by the light-receiving element. The communication is carried out based on a flickering pattern or a strong and weak pattern of the light that is received.

In a case where the electrical interconnection in the signal-processing substrate is substituted with the optical waveguide, it is expected that the above-described problems related to the electrical connection may be solved, and thus an additional high throughput of the signal-processing substrate may be realized.

However, when the electrical interconnection is substituted with the optical waveguide, an optical waveguide module which includes a light-emitting element and a light-receiving element that are optically connected to each other by the optical waveguide is used in order for an electrical signal and an optical signal to be mutually converted.

For example, PTL 1 discloses an optical interface including a printed board, a light-emitting element that is mounted on the printed board, and an optical waveguide that is provided on a lower surface side of the printed board. In addition, the optical waveguide and the light-emitting element are optically connected to each other via a through-hole that is formed in the printed board as a through-hole that transmits an optical signal.

However, in regard to the above-described optical interface, there is a problem in that optical coupling loss is large in optical coupling between the light-emitting element and the optical waveguide. Specifically, when signal light that is emitted from a light-emitting unit of the light-emitting element passes through the through-hole and is incident on the optical waveguide, the signal light radially diverges, and thus the signal light is not entirely incident on the optical waveguide. Therefore, a part of the signal light does not contribute to the optical communication and an increase in optical coupling loss is caused.

CITATION LIST

Patent Literature

[PTL 1] Japanese Unexamined Patent Application, First Publication No. 2005-294407

SUMMARY OF INVENTION

Technical Problem

An object of the invention is to provide an optical waveguide module that has low optical coupling loss between an optical element and an optical waveguide and is capable of performing high-quality optical communication, a method for efficiently producing the optical waveguide, and an electronic apparatus that is provided with the optical waveguide module and is capable of performing high-quality optical communication.

Solution to Problem

The above-described objects are accomplished by the invention described in the following (1) to (8).

(1) An optical waveguide module including:
an optical waveguide including a core portion, a clad portion that is provided to cover a side surface of the core portion, and an optical path-converting unit that is provided partway along the core portion or on an extended line of the core portion and that converts an optical path of the core portion to the outside of the clad portion;
an optical element that is provided over the clad portion;
a circuit board that is provided between the optical waveguide and the optical element and has a through-hole formed along an optical path connecting between the optical path-converting unit and the optical element; and
a sealing portion that is transparent and is formed in a gap between the optical element and the circuit board;

wherein a part of the sealing portion is inserted into the through-hole, and an inserted portion of the sealing portion functions as a lens for converging signal light passing though the optical path.

(2) The optical waveguide module according to (1), wherein a surface of the lens has a convex curve protruding toward the optical waveguide.

(3) The optical waveguide module according to (1) or (2), wherein the sealing portion is made of a resin material.

(4) The optical waveguide module according to any one of (1) to (3), wherein a focal point of the lens is positioned in at least one of the optical path-converting unit and a light-receiving-and-emitting unit of the optical element.

Moreover, the optical path-converting unit means the optical path-converting unit and the vicinity of the optical path-converting unit. In addition, similar to this, the light-receiving-and-emitting unit means the light-receiving-and-emitting unit and the vicinity of the light-receiving-and-emitting unit.

(5) A method for producing an optical waveguide module including an optical waveguide including a core portion, a clad portion that is provided to cover a side surface of the core portion, and an optical path-converting unit that is provided partway along the core portion or on an extended line of the core portion and that converts an optical path of the core portion to the outside of the clad portion; an optical element that is provided over the clad portion; a circuit board that is provided between the optical waveguide and the optical element and has a through-hole formed along an optical path connecting between the optical path-converting unit and the optical element; a sealing portion that is transparent and is formed in a gap between the optical element and the circuit board; and a lens formed in the through-hole, wherein the method includes supplying a paste sealing material in a gap between the optical element and the circuit board after mounting the optical element on one surface of the circuit board; and forming the sealing portion and the lens by introducing the sealing material in the through-hole and then solidifying the sealing material.

(6) The method for producing an optical waveguide module according to (5), wherein the sealing material is introduced into the through-hole by capillarity of the through-hole.

(7) The method for producing an optical waveguide module according to (5), wherein the sealing material is introduced into the through-hole by a pressure difference between the ends of the through-hole.

(8) An electronic apparatus including the optical waveguide module according to any one of (1) to (4).

According to the invention, since the lens is provided between the optical element and the optical waveguide, optical coupling loss between the optical element and the optical waveguide can be reduced. Accordingly, an optical waveguide module, in which an S/N ratio of an optical carrier wave is high and which is capable of performing high-quality optical communication, can be obtained.

In addition, according to the invention, the optical waveguide module can be efficiently produced.

In addition, it is possible to obtain an electronic apparatus having high reliability which can perform high-quality optical communication, because the electronic apparatus according to the present invention includes the optical waveguide module.

DESCRIPTION OF EMBODIMENTS

Hereinafter, an optical waveguide module, a method for producing the optical waveguide module, and an electronic apparatus of the invention will be described in detail based on preferred embodiments shown in the attached drawings.

<Optical Waveguide Module>

<<First Embodiment>>

First, a description will be made with respect to a first embodiment of an optical waveguide module of the invention.

Figure 1:
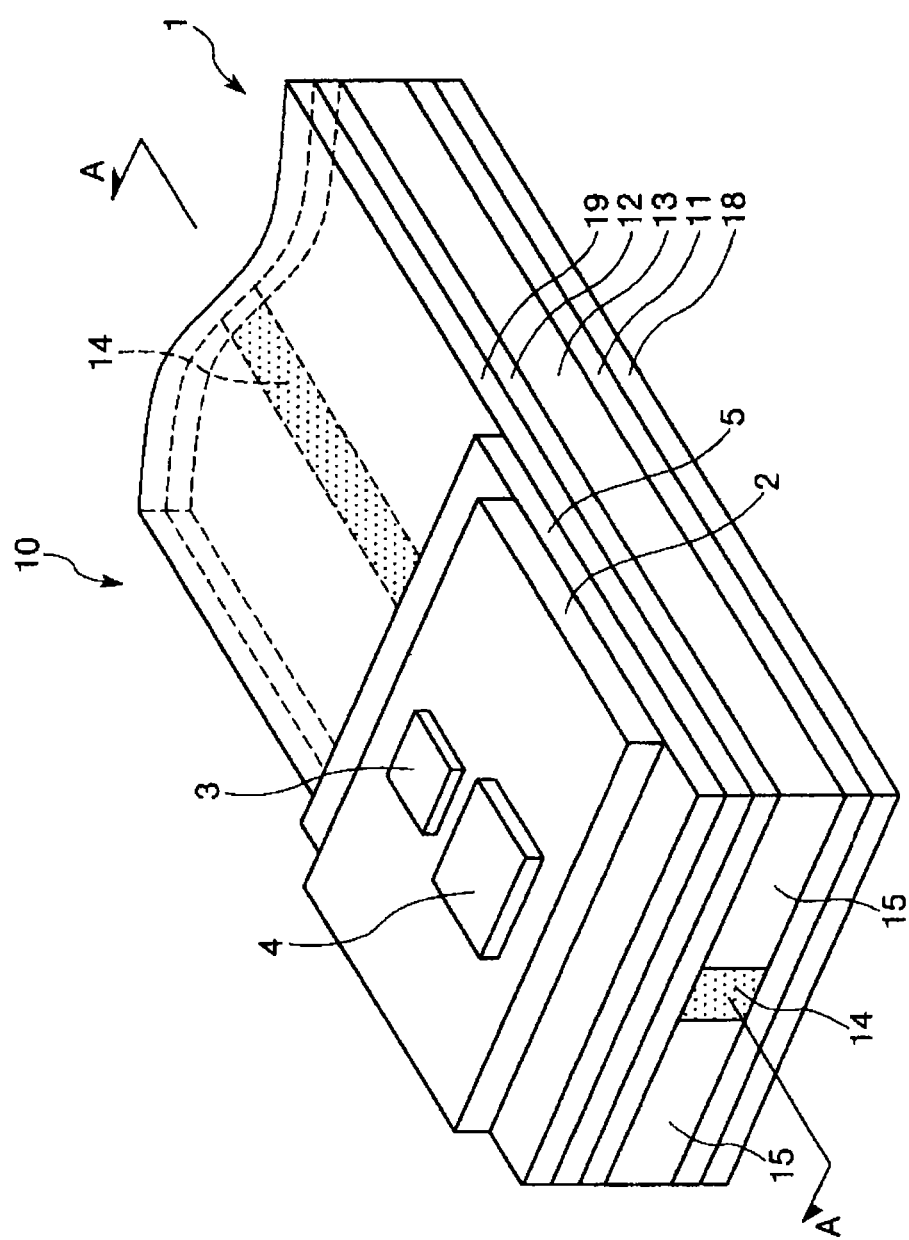
FIG. 1 is a perspective diagram illustrating a first embodiment of an optical waveguide module of the invention.
Figure 2:
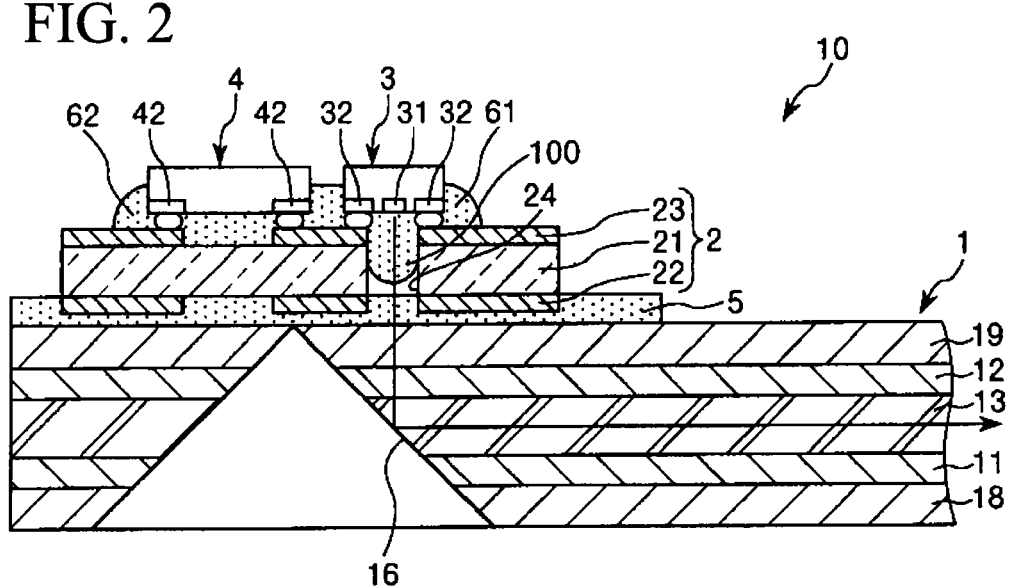
FIG. 2 is a cross-sectional diagram taken along a line A-A in FIG. 1.
Figure 3:
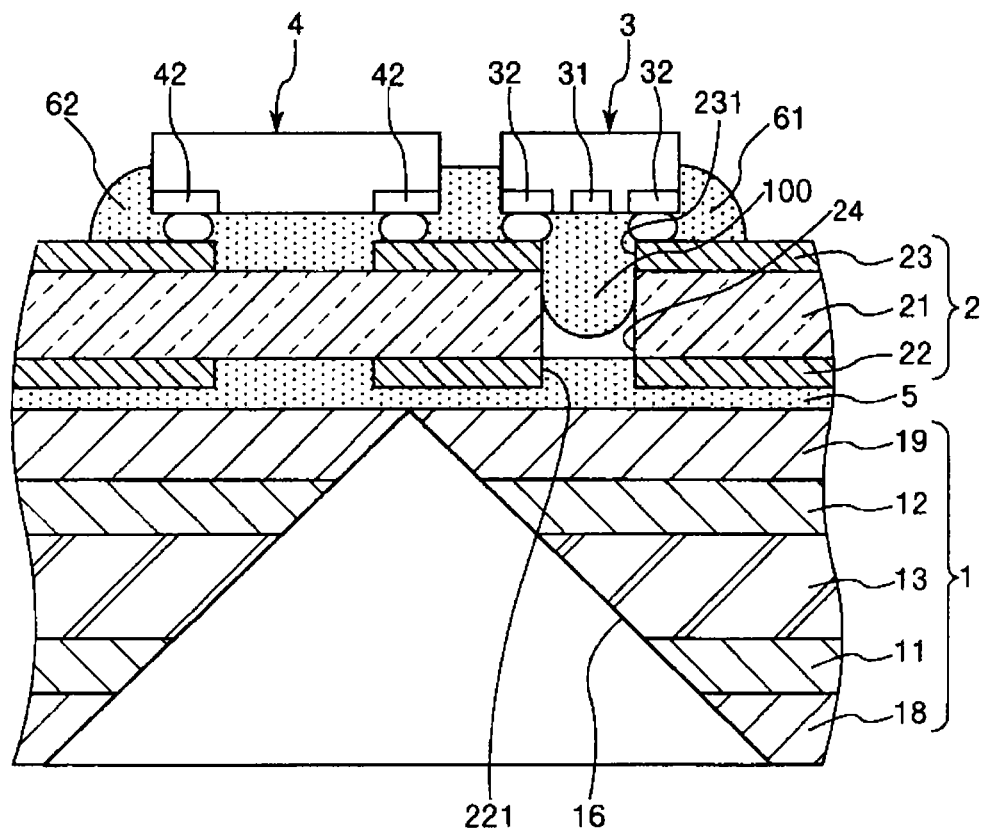
FIG. 3 is a partially enlarged diagram of FIG. 2.

FIG. 1 shows a perspective diagram illustrating a first embodiment of an optical waveguide module of the invention, FIG. 2 shows a cross-sectional diagram taken along a line A-A of FIG. 1, and FIG. 3 shows a partially enlarged diagram of FIG. 2. In addition, in the following description, an upper side of FIGS. 2 and 3 is referred to as "up" and a lower side is referred to as "down". In addition, in the respective drawings, a thickness direction is emphatically drawn.

An optical waveguide module 10 shown in FIG. 1 includes an optical waveguide 1, a circuit board 2 that is provided at an upper side of the optical waveguide 1, and a light-emitting element 3 (optical element) that is mounted on the circuit board 2.

The optical waveguide 1 has a long strip shape, and the circuit board 2 and the light-emitting element 3 are provided at one end (the left end in FIG. 2) of the optical waveguide 1.

The light-emitting element 3 is an element that converts an electrical signal to an optical signal, emits the optical signal from a light-emitting unit 31, and makes the optical signal be incident on the optical waveguide 1. The light-emitting element 3 shown in FIG. 2 includes the light-emitting unit 31 that is provided on a lower surface thereof, and an electrode 32 that is electrically conducted to the light-emitting unit 31. The light-emitting unit 31 emits the optical signal toward a lower side of FIG. 2. In addition, an arrow shown in FIG. 2 represents an example of an optical path of signal light that is emitted from the light-emitting element 3.

In addition, an interval between the circuit board 2 and the light-emitting element 3 is filled with a transparent sealing material (sealing portion) 61.

On the other hand, a mirror (an optical path-converting unit) 16 is provided to the optical waveguide 1 at a position corresponding to the light-emitting element 3. The mirror 16 converts an optical path of the optical waveguide 1, which extends in a horizontal direction of FIG. 2, to the outside of the optical waveguide 1. In FIG. 2, the optical path is converted by 90° in order for the optical path to be optically connected to the light-emitting unit 31 of the light-emitting element 3. The signal light, which is emitted from the light-emitting element 3, can be incident on a core portion 14 of the optical waveguide 1 via the mirror 16. In addition, although not shown in the drawing, a light-receiving element is provided at the other end of the optical waveguide 1. This light-receiving element is also optically connected to the optical waveguide 1, and the signal light that is incident on the optical waveguide 1 reaches the light-receiving element. As a result, an optical communication is realized in the optical waveguide module 10.

In addition, a through-hole 24 is formed so as to pass through the circuit board 2 by which a light path connects between the mirror 16 and the light-emitting unit 31 in the circuit board 2.

Here, a part of the sealing material 61 is deformed so as to be introduced into the through-hole 24. A part of the sealing material 61, which is introduced into the through-hole 24, acts as a lens for changing the light path connecting the mirror 16 and the light-emitting unit 31. In FIGS. 2 and 3, a part of the sealing material 61 is a lens 100.

The lens 100 is configured to suppress divergence of the signal light by converting the signal light that is incident on the optical waveguide 1 from the light-emitting unit 31 to convergent light or parallel light, and to allow a relatively large number of signal light beams to reach an effective region of the mirror 16. Accordingly, when this lens 100 is provided, optical coupling efficiency between the light-emitting element 3 and the optical waveguide 1 is improved.

Hereinafter, respective units of the optical waveguide module 10 will be described in detail.

(Optical Waveguide)

The optical waveguide 1 shown in FIG. 1 includes a strip-shaped laminated body that is obtained by laminating a clad layer (first clad layer) 11, a core layer 13, and a clad layer (second clad layer) 12 in this order from a lower side. As shown in FIG. 1, in the core layer 13 among these, one core portion 14 having a linear shape in a plan view and side clad portions 15 that are adjacent to side surfaces of the core portion 14 are formed. The core portion 14 extends along a longitudinal direction of the strip-shaped laminated body, and is positioned at approximately the center of the width of the laminated body. In addition, in FIG. 1, dots are attached to the core portion 14.

In the optical waveguide 1 shown in FIG. 2, the light, which is incident via the mirror 16, can be made to propagate to the other end by totally reflecting the light at an interface between the core portion 14 and the clad portion (the respective clad layers 11 and 12, and the respective side clad portions 15). According to this, optical communication can be carried out based on at least one of a flickering pattern and a strong and weak pattern of the light that is received at an emitting end.

It is necessary for a difference in a refractive index to be present at the interface between the core portion 14 and the clad portion so as to cause the total reflection to occur at the interface. A refractive index of the core portion 14 can be larger than that of the clad portion, and the difference in the refractive index is not particularly limited. However, it is preferable that the refractive index of the clad portion be 0.5% or more, and more preferably 0.8% or more. On the other hand, although the upper limit can not be particularly set, it is preferable that the upper limit be set to approximately 5.5%. When the difference in the refractive index is less than the lower limit, an effect of transferring the light can be decreased, and even when the difference exceeds the upper limit, it is difficult to expect that light transmission efficiency further increases.

In addition, the difference in the refractive index is expressed by the following equation, in which the refractive index of the core portion 14 is set to A and the refractive index of the clad portion is set to B.

$$\text{Difference in refractive index (\%)}=|(A/B)-1|\times 100$$

In addition, in a configuration shown in FIG. 1, the core portion 14 is formed in a linear shape in a plan view, but curvature, divergence, or the like can be formed partway along the core portion 14, and the shape is arbitrarily set.

In addition, a shape of a transverse cross-section of the core portion 14 is generally a quadrilateral such as a square and a rectangle. However, the shape is not particularly limited, and can be a circular shape such as a perfect circle and an ellipse, or a polygonal shape such as a rhombus, a triangle, and a pentagon.

Although not particularly limited, it is preferable that the width and height of the core portion 14 be approximately 1 to 200 μm, respectively, more preferably 5 to 100 μm, and still more preferably 20 to 70 μm.

A constituent material of the core layer 13 is not particularly limited as long as the difference in the refractive index occurs in the material, and specific examples thereof include glass materials such as silica glass and borosilicate glass in addition to various resin materials including cyclic ether-based resins such as an acryl-based resin, a methacryl-based resin, polycarbonate, polystyrene, an epoxy-based resin, and an oxetane-based resin, cyclic olefin-based resins such as polyamide, polyimide, polybenzoxazole, polysilane, polysilazane, benzocyclobutene-based resin, and norbornene-based resin.

In addition, among these, the norbornene-based resin is particularly preferable. This norbornene-based polymer can be obtained by all kinds of polymerization reactions in the related art such as polymerization using a polymerization initiator (for example, a polymerization initiator such as nickel and other transition metals) in addition to, for example, ring-opening metathesis polymerization (ROMP), combination of the ROMP and a hydrogenation reaction, polymerization by radicals and cations, and polymerization using a cationic palladium polymerization initiator.

On the other hand, the clad layers 11 and 12 are positioned at a lower side and an upper side of the core layer 13, respectively. The respective clad layers 11 and 12 make up the clad portion that surrounds the outer periphery of the core portion 14 in combination with the respective side clad portions 15. According to this, the optical waveguide 1 functions as a light-guiding path capable of allowing the signal light to propagate therethrough without being leaked.

It is preferable that an average thickness of the clad layers 11 and 12 be 0.1 to 1.5 times an average thickness of the core layer 13 (average height of each core portion 14), and more preferably 0.2 to 1.25 times. Specifically, although not particularly limited, commonly, it is preferable that the average thickness of each of the clad layers 11 and 12 be approximately 1 to 200 μm, more preferably approximately 3 to 100 μm, and still more preferably approximately 5 to 60 μm.

According to this, a function as the clad layer is suitably exhibited while preventing an increase in size (thickening) of the optical waveguide 1 more than necessary.

In addition, as a constituent material of the respective clad layers 11 and 12, for example, the same material as the above-described constituent material of the core layer 13 can be used, but a norbornene-based polymer is particularly preferable.

In addition, when selecting the constituent material of the core layer 13 and the constituent material of the clad layers 11 and 12, it is preferable to select the materials in consideration of a difference between refractive indexes of both of the constituent materials. Specifically, it is preferable to select the materials such that the refractive index of the constituent material of the core layer 13 become sufficiently larger than that of the clad layers 11 and 12 so as to totally reflect light at the boundary between the core layer 13 and the clad layers 11 and 12 in a reliable manner. According to this, a sufficient difference in a refractive index in a thickness direction of the optical waveguide 1 can be obtained, and thus leakage of light from the core portion 14 to the clad layers 11 and 12 can be suppressed.

In addition, from the viewpoint of suppressing attenuation of light, it is important that adhesiveness (affinity) between the constituent material of the core layer 13 and the constituent material of the clad layers 11 and 12 is high.

In addition, the optical waveguide 1 shown in FIG. 2 has a support film 18 that is provided on a lower surface of the clad layer 11 and a cover film 19 that is provided on the upper surface of the clad layer 12. The support film 18 and the cover film 19 can be included or omitted depending on the situation.

Examples of a constituent material of the support film 18 and the cover film 19 include various resin materials including polyolefin such as polyethylene terephthalate (PET), polyethylene, and polypropylene, polyimide, polyamide, and the like.

In addition, although not particularly limited, it is preferable that an average thickness of each of the support film 18 and the cover film 19 be approximately 5 to 200 μm, and more preferably approximately 10 to 100 μm. When the support film 18 and the cover film 19 have a thickness in the range, these films can have suitable stiffness. Due to this, these films do not readily decrease flexibility of the optical waveguide 1. In addition, the cover film 19 having a thickness in the range does not readily disturb light transmission.

In addition, the supporting film and the clad layer 11 are adhered or jointed, and the cover film and the clad layer 12 are adhered or jointed. Examples of an adhesion or jointing method include thermal pressing, adhesion using an adhesive or a sticking agent, and the like.

Among these, examples of an adhesive layer include various hot-melt adhesives (a polyester-based adhesive and a modified olefin-based adhesive), and the like in addition to an acryl-based adhesive, a urethane-based adhesive, and a silicone-based adhesive. In addition, as an adhesive having particularly high heat resistance, a thermoplastic polyimide adhesive such as polyimide, polyimide amide, polyimide amide ether, polyester imide, and polyimide ether is preferably used. The adhesive layer made by using such a material has relatively high flexibility. Therefore, even when the optical waveguide 1 is deformed, the adhesive layer can be deformed following the optical waveguide 1. As a result, it is possible to reliably prevent the peeling of the adhesive layer due to the change of the shape.

In addition, although not particularly limited, it is preferable that an average thickness of the adhesive layer be approximately 1 to 100 μm, and more preferably approximately 5 to 60 μm.

Moreover, as explained above, the mirror 16 is provided partway along the optical waveguide 1 (refer to FIG. 2). The mirror 16 is constructed of an inner wall surface of a space (cavity) obtained by performing an excavation process partway along the optical waveguide 1. A part of the inner wall surface is a flat surface that crosses the core portion 14 at an inclination of 45°, and this flat surface serves as the mirror 16. The optical waveguide 1 and the light-emitting unit 31 are optically connected to each other via the mirror 16.

In addition, a reflective film can be formed on the mirror 16 as necessary. As the reflective film, a metallic film of Au, Ag, Al, or the like is preferably used.

Furthermore, the mirror 16 can be substituted with an optical path conversion means such as a bending waveguide which bends the optical axis of the core portion 14 by 90°.

(Light-Emitting Element)

As described above, the light-emitting element 3 includes the light-emitting unit 31 and the electrode 32 on a lower surface thereof. However, specifically, the light-emitting element 3 is a semiconductor laser such as a surface light-emitting laser (VCSEL) or a light-emitting element such as a light-emitting diode (LED).

On the other hand, a semiconductor device 4 is mounted on the circuit board 2 of the optical waveguide module 10 shown in FIGS. 1 and 2 to be adjacent to the light-emitting element 3. The semiconductor device 4 is a device that controls an operation of the light-emitting element 3, and includes an electrode 42 on a lower surface thereof. Examples of the semiconductor device 4 include various LSIs, RAMs, and the like in addition to a combination IC including a driver IC, a transimpedence amplifier (TIA), a limiting amplifier (LA), and the like.

In addition, the light-emitting element 3 and the semiconductor device 4 are electrically connected to the circuit board 2 to be described later, and are configured to control a light-emission pattern of the light-emitting element 3 and a strong and weak pattern of the light emission by the semiconductor device 4.

(Circuit Board)

The circuit board 2 is provided on an upper side of the optical waveguide 1, and a lower surface of the circuit board 2 and an upper surface of the optical waveguide 1 are adhered to each other via an adhesive layer 5.

As shown in FIG. 2, the circuit board 2 includes an insulating substrate 21, a conductive layer 22 that is provided on a lower surface of the insulating substrate 21, and a conductive layer 23 that is provided on an upper surface of the insulating substrate 21. The light-emitting element 3 and the semiconductor device 4 that are mounted on the circuit board 2 are electrically connected to each other via the conductive layer 23.

The through-hole 24 is formed in the insulating substrate 21 so as to pass along the optical path connecting the light-emitting unit 31 of the light-emitting element 3 and the mirror 16 of the optical waveguide 1. The through-hole 24 is formed so as to pass through the insulating substrate 21 along the optical path in the thickness direction of the insulating substrate 21.

In addition, the planar shape of both openings of the through-hole 24 in the insulating substrate 21 as shown in FIG. 3 is a circle. The cross-sectional area of the through-hole 24 is fixed along the thickness direction of the insulating substrate 21. That is, the through-hole 24 has a columnar shape.

Moreover, the shape of both the openings of the through-hole 24 is not particular limited, and examples thereof include a circular shape such a perfect circle, and an ellipse, a polygonal shape such as a triangle, a quadrilateral, and hexagon, and the like.

In addition, it is preferable that the insulating substrate 21 have flexibility. The insulating substrate 21 having flexibility contributes to improvement of adhesiveness between the circuit board 2 and the optical waveguide 1 and has excellent followability with respect to a shape variation. As a result, in a case where the optical waveguide 1 has flexibility, the entirety of the optical waveguide module 10 has flexibility, and thus mountability becomes excellent. In addition, when the optical waveguide module 10 is made to be curved, peeling between the insulating substrate 21 and the conductive layers 22 and 23, or peeling between the circuit board 2 and the optical waveguide 1 can be reliably prevented, and thus a decrease in insulation property or a decrease in transmission efficiency accompanying the peeling can be prevented.

It is preferable that Young's modulus (tensile elastic modulus) of the insulating substrate 21 be 1 to 20 GPa under a general room-temperature environment (approximately 20 to 25° C.), and more preferably approximately 2 to 12 GPa. When the range of the Young's modulus is as described above, the insulating substrate 21 has sufficient flexibility for obtaining the above-described effect.

Examples of a constituent material of the insulating substrate 21 include various resin materials such as a polyimide-based resin, a polyamide-based resin, an epoxy-based resin, various vinyl-based resins, and a polyester-based resin including a polyethylene terephthalate resin. Among these, a constituent material including the polyimide-based resin as a main material is preferably used. The polyimide-based resin has high heat resistance, and excellent translucency and flexibility, and is particularly suitable as the constituent material of the insulating substrate 21.

In addition, specific examples of the insulating substrate 21 include a film substrate that is used in a copper-clad polyester film substrate, a copper-clad polyimide film substrate, a copper-clad aramid film substrate, and the like.

In addition, it is preferable that an average thickness of the insulating substrate 21 be approximately 5 to 50 μm, and more preferably approximately 10 to 40 μm. The insulating substrate 21 having this thickness has sufficient flexibility regardless of the constituent material thereof. In addition, when the thickness of the insulating substrate 21 is within the above-described range, thickness reduction of the optical waveguide module 10 is realized.

In addition, when the thickness of the insulating substrate 21 is within the above-described range, it is possible to prevent the transmission efficiency from being decreased due to divergence of signal light. For example, the signal light, which is emitted from the light-emitting unit 31 of the light-emitting element 3, passes through the circuit board 2 while diverging at a constant emission angle, and is incident on the mirror 16. However, in a case where a distance between the light-emitting unit 31 and the mirror 16 is too large, there is a concern that the signal light diverges too much, and thus a quantity of light that reaches the mirror 16 decreases. Conversely, when the average thickness of the insulating substrate 21 is set within the above-described range, the distance between the light-emitting unit 31 and the mirror 16 can be reliably made small, and thus the signal light reaches the mirror 16 before widely diverging. As a result, a decrease in the quantity of light that reaches the mirror 16 is prevented, and thus a loss (an optical coupling loss) accompanying optical coupling between the light-emitting element 3 and the optical waveguide 1 can be sufficiently reduced.

In addition, the insulating substrate 21 can be a rigid substrate having a relatively high rigidity besides the flexible substrate explained above.

The insulating substrate 21 having a relatively high rigidity has high elasticity, and can prevent the damage of the light-emitting element caused by bending.

It is preferable that Young's modulus (tensile elastic modulus) of the insulating substrate 21 having a relatively high rigidity be 5 to 500 GPa under a general room-temperature environment (approximately 20 to 25° C.), and more preferably approximately 12 to 30 GPa. When the range of the Young's modulus is as described above, the insulating substrate 21 reliably obtains the abovementioned effects.

Examples of a constituent material of the insulating substrate 21 include a material in which paper, glass fabric, a resin film, or the like is used as a base material and the base material is impregnated with a resin material such as a phenol-based resin, a polyester-based resin, an epoxy-based resin, a cyanate-based resin, a polyimide-based resin, and a fluorine-based resin.

Specific examples of the constituent material include a heat-resistant thermoplastic organic rigid substrate such as a polyetherimide resin substrate, a polyetherketone resin substrate, and a polysulphone-based resin substrate, a ceramics-based rigid substrate such as an alumina substrate, an aluminum nitride substrate, and a silicon carbide substrate in addition to an insulating substrate that is used in a composite copper-clad laminated plate such as a glass fabric and copper-clad epoxy laminated plate and a glass non-woven fabric and copper-clad epoxy laminated plate.

When the insulating substrate 21 is made of the material explained above, the average thickness of the insulating substrate 21 is preferably in a range of about 300 μm to about 3 mm, and more preferably in a range of about 500 μm to about 2.5 mm.

In addition, the insulating substrate 21 can be one sheet of substrate, but can be a multi-layer substrate (a build-up substrate) obtained by laminating plural layers of substrates. In this case, a patterned conductive layer is provided between the plural layers of substrates, and an arbitrary electrical circuit can be formed in the conductive layer. According to this, a high-density electrical circuit can be constructed in the insulating substrate 21.

In addition, one or a plurality of through-holes, which penetrate through the insulating substrate 21 in a thickness direction, can be formed in the insulating substrate 21. Each of the through-holes can be filled with a conductive material, or a film of a conductive material can be formed along an inner wall surface of the through-hole. The conductive material becomes a penetration via that electrically connects both surfaces of the insulating substrate 21.

In addition, each of the conductive layers 22 and the conductive layer 23, which are provided in the insulating substrate 21, is formed from a conductive material. A predetermined pattern is formed in the respective conductive layers 22 and 23, and this pattern functions as an interconnection. In a case where the penetration via is formed in the insulating substrate 21, the penetration via and the respective conductive layers 22 and 23 are connected, and thus the conductive layer 22 and the conductive layer 23 are electrically conducted at a part.

Examples of the conductive material that is used for the respective conductive layers 22 and 23 include various metallic materials such as aluminum (Al), copper (Cu), gold (Au), silver (Ag), platinum (Pt), nickel (Ni), tungsten (W), and molybdenum (Mo).

In addition, the average thickness of each of the conductive layers 22 and 23 is appropriately set according to conductivity that is required for the interconnection, or the like, but for example, the average thickness is set to approximately 1 to 30 μm.

In addition, a width of an interconnection pattern that is formed in each of the respective conductive layers 22 and 23 is appropriately set according to the conductivity that is required for the interconnection, the thickness of each of the conductive layers 22 and 23, or the like, but it is preferable that the width be, for example, approximately 2 to 1,000 μm, and more preferably approximately 5 to 500 μm.

In addition, this interconnection pattern is formed by, for example, a method of patterning a conductive layer that is formed once on an entire surface (for example, copper foil of a copper-clad substrate is partially etched), a method of transferring a conductive layer, which is patterned in advance, onto a substrate that is separately prepared, and the like.

In addition, the conductive layers 22 and 23 shown in FIG. 3 include openings 221 and 231 that are provided not to interfere with the optical path between the light-emitting unit 31 of the light-emitting element 3 and the mirror 16, respectively. As a result, a vacant space having the height corresponding to the thickness of the conductive layer 22 is formed in the opening 221, and a vacant space having the height corresponding to the thickness of the conductive layer 23 is formed in the opening 231. Each of the openings 221, 231 communicates with the through-hole 24 formed in the insulating substrate 21.

In addition, the light-emitting element 3 or semiconductor device 4 and the conductive layer 23 are electrically and mechanically connected to each other by various kinds of solder, various brazing materials, or the like.

Examples of the solder and the brazing materials include various kinds of lead-free solder such as Sn—Ag—Cu based solder, Sn—Zn—Bi based solder, Sn—Cu based solder, Sn—Ag—In—Bi based solder, and Sn—Zn—Al based solder in addition to Sn—Pb based lead solder, various low-temperature brazing materials defined in JIS, and the like.

In addition, as the light-emitting element 3 or the semiconductor device 4, for example, an element of a package type such as a BGA (Ball Grid Array) type and an LGA (Land Grid Array) type is used.

In addition, there is a concern that when the conductive layer 23 and the solder (or brazing material) come into contact with each other, a phenomenon in which parts of metal components constituting the conductive layer 23 are dissolved toward the solder side can occur. Particularly, this phenomenon frequently occurs with respect to the conductive layer 23 formed from copper, and thus this phenomenon is called "copper erosion". When the copper erosion occurs, there is a problem in that the conductive layer 23 is thinned or damaged, and thus a function of the conductive layer 23 can be deteriorated.

Therefore, it is preferable to form a copper erosion-preventing film (base layer) as a base of the solder in advance on a surface of the conductor layer 23 that comes into contact with the solder. The copper erosion is prevented due to formation of the copper erosion-preventing film, and thus the function of the conductor layer 23 may be maintained over a long period of time.

Examples of a constituent material of the copper erosion-preventing film include nickel (Ni), gold (Au), platinum (Pt), tin (Sn), palladium (Pd), and the like. The copper erosion-preventing film may be a single layer formed from one kind of the metal compositions, or may be a composite layer (for example, a Ni—Au composite layer, a Ni—Sn composite layer, and the like) including two kinds or more of the metal compositions.

Although not particularly limited, it is preferable that an average thickness of the copper erosion-preventing film be approximately 0.05 to 5 μm, and more preferably approximately 0.1 to 3 μm. According to this, a sufficient copper erosion-preventing operation can be exhibited while suppressing an electrical resistance of the copper erosion-preventing film itself.

In addition, the electrical connection between the light-emitting element 3 or semiconductor device 4 and the conductive layer 23 can be performed by a manufacturing method using wire bonding, an anisotropic conductive film (ADF), an anisotropic conductive paste (ACP), or the like in addition to the above-described connection method.

Among these, according to the wire bonding, even when a difference in heat expansion occurs between the light-emitting element 3 or semiconductor device 4 and the circuit board 2, since the difference in heat expansion can be absorbed by a bonding wire having high flexibility, stress is prevented from being focused to a connection portion.

In addition, the circuit board 2 and the optical waveguide 1 are adhered to each other by the adhesive layer 5. Examples of an adhesive that constructs the adhesive layer 5 include various hot-melt adhesives (a polyester-based adhesive and a modified olefin-based adhesive) and the like in addition to an epoxy-based adhesive, an acryl-based adhesive, a urethane-based adhesive, and a silicone-based adhesive. In addition, examples of an adhesive having particularly high heat resistance include thermoplastic polyimide adhesives such as polyimide, polyimide amide, polyimide amide ether, polyester imide, and polyimide ether.

In addition, the optical waveguide module 10 can include the circuit board 2 at the other end of the optical waveguide 1, and can include a connector that enables a connection with other optical components, or the like.

Figure 4:
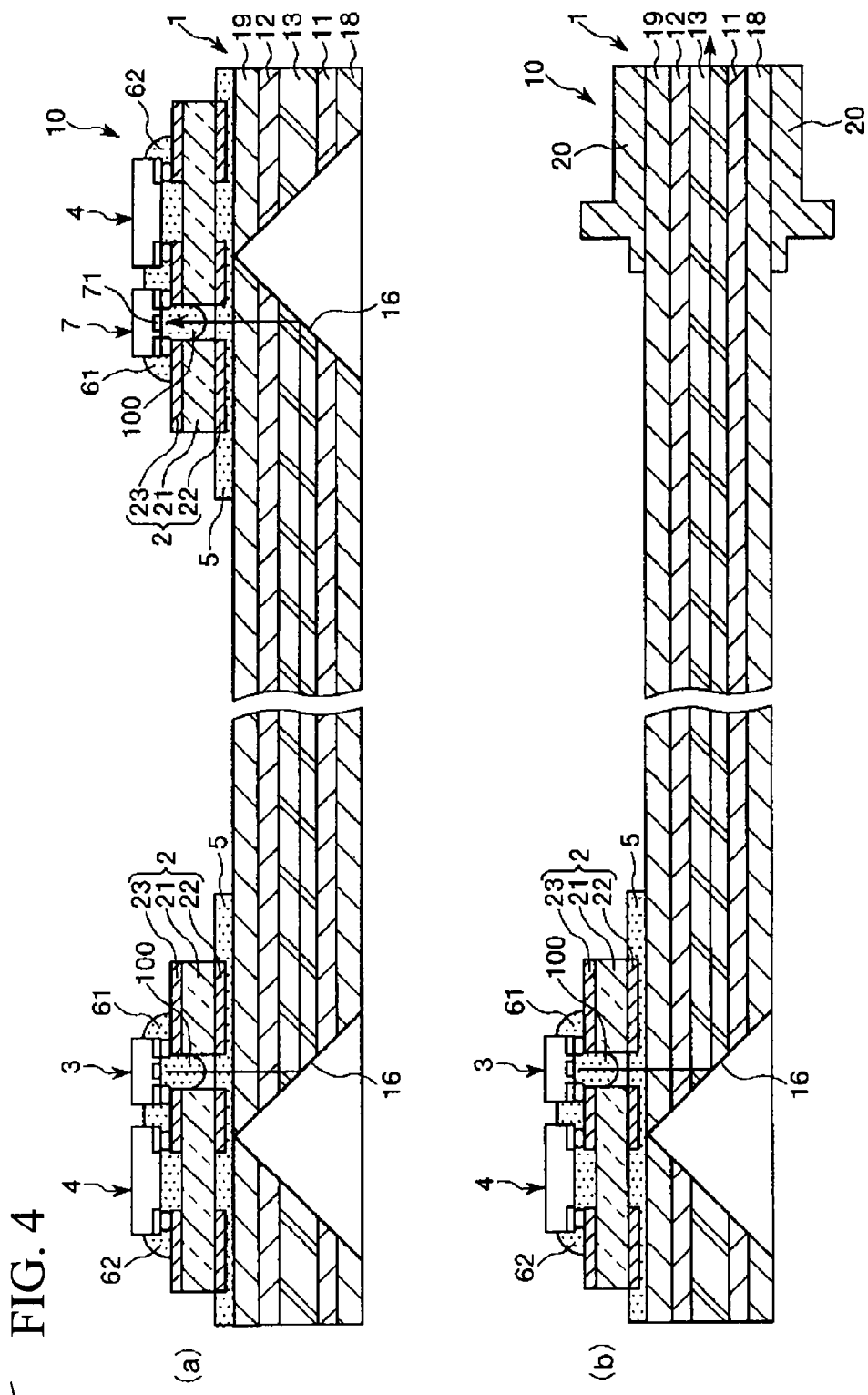
FIG. 4 is a longitudinal cross-sectional diagram illustrating another configuration example of the optical waveguide module shown in FIG. 2.

FIG. 4 shows a longitudinal cross-sectional diagram illustrating another configuration example of the optical waveguide module shown in FIG. 2.

In the optical waveguide module 10 shown in FIG. 4(*a*), the circuit board 2 is also provided on an upper surface of the other end (right end in FIGS. 2 and 4) of the optical waveguide 1. In addition, a light-receiving element 7 and the semiconductor device 4 are mounted on the circuit board 2. In addition, the mirror 16 is formed in the optical waveguide 1 in correspondence with a position of a light-receiving unit 71 of the light-receiving element 7.

In the optical waveguide module 10, when the signal light, which is emitted from the optical waveguide 1 via the mirror 16, reaches the light-receiving unit 71 of the light-receiving element 7, conversion from an optical signal to an electrical signal occurs. In this way, an optical communication between both ends of the optical waveguide 1 is performed.

On the other hand, in the optical waveguide module 10 shown in FIG. 4(*b*), a connector 20 that enables a connection with other optical components is provided at the other end of the optical waveguide 1. Examples of the connector 20 include a PMT connector that is used for a connection with an optical fiber, and the like. When the optical waveguide module 10 is connected to the optical fiber via the connector 20, an optical communication over a relatively long distance can be realized.

On the other hand, in FIG. 4, a description is given with respect to a case in which one-to-one optical communication is carried out between one end and the other end of the optical waveguide 1, but an optical splitter, which is capable of diverging the optical path into a plurality of optical paths, can be connected to the other end of the optical waveguide 1.

(Lens)

The sealing material 61 is disposed in a gap between the light-emitting element 3 and the circuit board 2 and at a side portion of the light-emitting element 3. According to this, the sealing material 61 is filled in the vacant space that is formed due to the formation of the opening 231 in the conductive layer 23.

On the other hand, a sealing material 62 is disposed in a gap between the semiconductor device 4 and the circuit board 2 and at a side portion of the semiconductor device 4.

The sealing materials 61 and 62 can increase weather resistance (heat resistance, humidity resistance, resistance to pressure change, and the like) of the light-emitting element 3 and the semiconductor device 4, and can reliably protect the light-emitting element 3 and the semiconductor device 4 from vibration, an external force, adhesion of foreign matter, and the like).

Any materials can be used as the sealing materials 61 and 62, as long as they are transparent. Examples of the sealing materials 61 and 62 include various resin materials including cyclic ether-based resins such as an acryl-based resin, a methacryl-based resin, polycarbonate, polystyrene, an epoxy-based resin, and an oxetane-based resin, and cyclic olefin-based resins such as polyamide, polyimide, polybenzoxazole, polysilane, polysilazane, benzocyclobutene-based resin, and norbornene-based resin. Among these, since the resin material is easily solidified by heat or light, and the lens 100 can be produced with high precision, the resin material is preferably used.

In addition, a part of the sealing material 61 filled with the opening 231 enters into the through-hole 24 formed in the insulating substrate 24. In FIG. 3, a part of the sealing material 61 enters partway in the depth direction of the through-hole 24. The end of the sealing material 61 which enters in the through-hole 24 is a convex curved surface which protrudes downward in FIG. 3, and functions as a lens for converging the light passing through the through-hole 24. In other words, a part of the sealing material 61 is the lens 100 which is made by deforming the sealing material 61.

The sealing material 61 is formed by feeding a paste into the through-hole 24 as explained below, and then solidifying. Surface tension is generated between the paste and the inside surface of the through-hole 24. Due to this, the end surface of the paste, which is introduced (inserted), naturally becomes a convex curved surface which protrudes toward the optical waveguide 1. By the convex curved surface, the lens 100 can converge the signal light passing through the sealing material 61.

In a case where the lens 100 is not provided, the signal light, which is emitted from the light-emitting unit 31, diverges until the signal light is incident on the optical waveguide 1, and thus signal light that deviates from an effective region of the mirror 16 occurs. At this time, the deviated signal light leads to loss of the signal light, and thus a quantity of light of the signal light that is reflected from the mirror 16 decreases. As a result, an S/N ratio of the optical communication decreases.

In contrast, when the lens 100 is provided, a function of causing the signal light to converge onto the surface of the optical waveguide 1 is achieved. As a result, a relatively large quantity of signal light is made to be incident on the mirror 16, and thus occurrence of loss of the signal light is suppressed, and the S/N ratio of the optical communication can be increased. In addition, the optical waveguide 1 and the optical waveguide module 10, which are capable of providing high-quality optical communication in a highly reliable manner, can be obtained.

The lens 100 shown in FIG. 3 is combined with the sealing material 61. Therefore, the position of the lens 100 relative to the light-emitting element 3 or the mirror 16 can be maintained with high precision. Therefore, the optical waveguide module 10 including the lens 100 has excellent resistance to weather.

The curved surface of the lens 100 can have any shape as long as it converges the signal light passing therethrough. Examples of the shape of the curved surface of the lens 100 include a spherical shape, and aspherical shape such as a parabola rotation shape, hyperbola rotation shape, and higher order curve rotation shape.

The area of the lens 100 in a planar view is varied depending on the cross-sectional area of the through-hole 24. Therefore, the cross-sectional area of the through-hole 24 is appropriately set depending on the optical performances of the lens 100. Specifically, the cross-sectional area of the through-hole 24 is preferably in a range of about 0.01 mm$^2$ to 10 mm$^2$, and more preferably in a range of about 0.01 mm$^2$ to 1 mm$^2$. Moreover, the area of the lens 100 in a planar view is substantially equal to the cross-sectional area of the through-hole 24.

In addition, the area of the lens 100 in a planar view is preferably in a range of about 1.2 to about 10 times larger than the area of the light-emitting unit 31 of the light-emitting element 3 (the area of the light-receiving unit 71 of the light-receiving element 7), and more preferably in a range of about 2 to about 5 times.

In addition, it is preferable that the lens 100 be positioned near the mirror 16.

The lens 100 having this configuration can convert the signal light that is radially emitted from the light-emitting unit 31 of the light-emitting element 3 into parallel light or converged light, and can convert the optical path in order for the signal light not to diverge any more. As a result, loss accompanying the divergence of the signal light can be reliably suppressed.

Furthermore, the lens 100 is preferably configured in such a manner that a focal point thereof is positioned in the vicinity of the light-emitting unit 31 of the light-emitting element 3. The lens 100 which is positioned in the vicinity of the light-emitting unit 31 can decrease the signal light which does not pass through the mirror 16, and reliably suppress the optical coupling loss of the signal light.

As explained above, it is possible to improve the optical coupling efficiency between the light-emitting unit 31 of the light-emitting element 3 and the mirror 16 by positioning the lens 100 in the through-hole 24, and produce the optical waveguide module 10 which can provide high-quality optical communication in a highly reliable manner.

In addition, since the lens 100 is formed by deforming a part of the sealing material 61, the formation and mounting are extremely easy. In addition, the position of the lens 100 relative to the light-emitting element 3 or the mirror 16 can be reliably maintained. Therefore, it is possible to produce the optical waveguide module 10 having high resistance to weather with high efficiency by using the lens 100.

Figure 5:
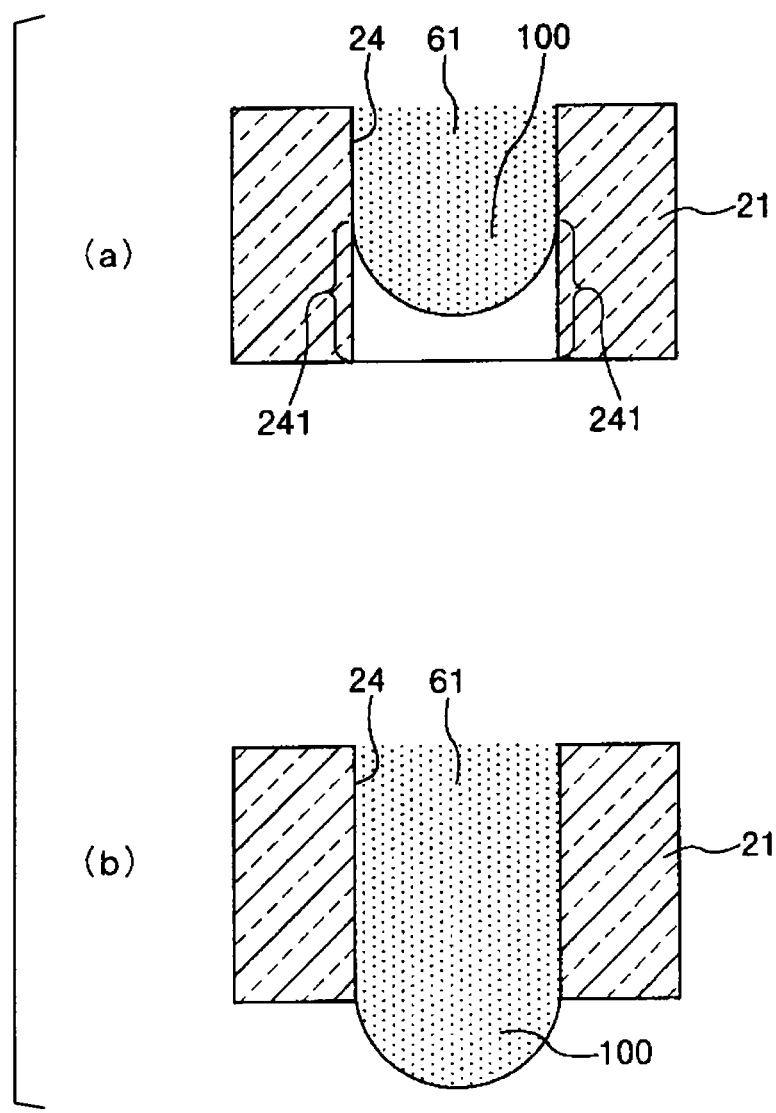
FIG. 5 is a longitudinal cross-sectional diagram illustrating another configuration example of the lens and the through-hole.

Moreover, the lens 100 may have a sectional shape in the longitudinal direction shown in FIG. 5.

FIG. 5 is a longitudinal sectional view showing another lens and through-hole. Moreover, the lens and the through-hole shown in FIG. 5 has the same configuration as the lens and the through-hole shown in FIG. 3 except for the following points.

In the through-hole 24 shown in FIG. 5 (a), the inside from halfway through the through-hole 24 in the depth direction to the lower end is subjected to a liquid-repellant treatment. In FIG. 5 (a), the area which is subjected to the liquid-repellant treatment is denoted by liquid-repellant area 241.

When the liquid-repellant area 241 is formed in the through-hole 24, and the sealing material 61, which is introduced from the upper end of the through-hole 24, reaches the liquid-repellant area 241, the sealing material 61 does not easily enter any more. In this way, it is possible to freely adjust the depth of the sealing material 61 in the through-hole 24 by appropriately forming the liquid-repellant area 241. Thereby, it is also possible to adjust the position of the lens 100 in the through-hole 24.

The material for the liquid-repellant treatment can be selected depending on the composition of the sealing material 61. Examples of the liquid-repellant treatment include treatments using a fluorine-based liquid-repellant film, a silicone-based liquid-repellant film, and a silane-coupling agent film; and treatments using various surface-reforming agents.

Moreover, it is possible to subject the area other than the liquid-repellant area 241 in the inside of the through-hole 24 in FIG. 5 (a) to a lyophilic treatment, if necessary. By the lyophilic treatment, the sealing material 61 easily enters into the through-hole 24, and the lens 100 having a target shape is easily formed.

Examples of the lyophilic treatment include surface-reforming treatments such as a plasma treatment, and an electron beam-treatment, film-forming treatments, for example a production of a silane coupling agent film.

On the other hand, the through-hole 24 may be fully filled with the sealing material 61 as shown in FIG. 5 (b). The sealing material 61 filling the entirety of the through-hole 24 protrudes from the lower end of the through-hole 24 toward the optical waveguide 1, and the lower end of the sealing material 61 has a curved surface. As a result, the lens 100 is formed on the lower side of the through-hole 24.

Moreover, in a case of FIG. 5 (b), it is only necessary to form an opening in the adhesive layer 5 at a point which corresponds to the through-hole 24. Thereby, it is possible to prevent the interference of the lens 100 by the adhesive layer 5.

In addition, it is also possible to form the lens 100 in the light-receiving element. In FIG. 4(a), the lens 100 is formed in the light-receiving element 7. The lens 100 formed in the light-receiving element 7 in FIG. 4(a) is formed as a part of the sealing material 61 which is supplied in a gap between the circuit board 2 and the light-receiving element 7, and enters into the through-hole 24. The signal light, which propagates through the optical waveguide 1 and is reflected by the mirror 16, is incident on the circuit board 2, and is converged by the lens 100. Therefore, the quantity of light which is incident on the light-receiving unit 71 of the light-receiving element 7 increases. That is, it is possible to suppress the optical coupling loss at the output side by forming the lens 100 in the light-receiving element 7. In addition, when the lens 100 is formed in both input and output sides, the propagating efficiency of the signal light can be further increased.

Moreover, the lens 100 in the light-receiving element 7 can have the characteristics of the lens 100 in the light-emitting element 3.

<<Second Embodiment>>

Next, a second embodiment of the optical waveguide module of the invention will be described.

Figure 6:
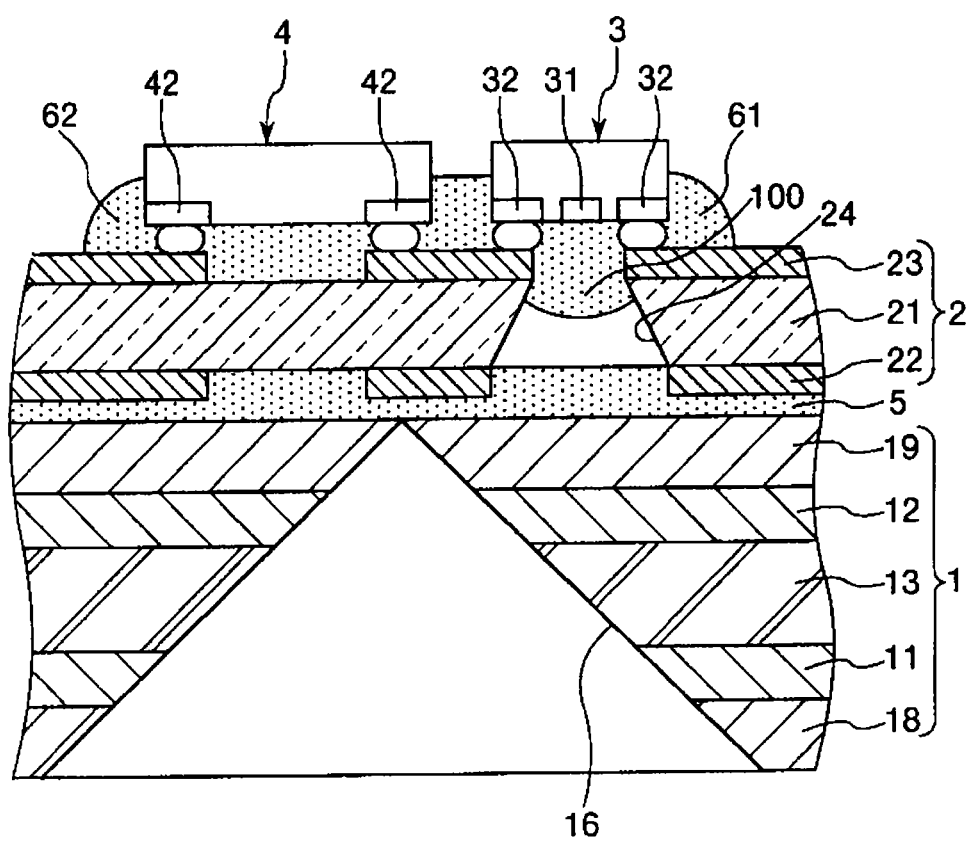
FIG. 6 is a longitudinal cross-sectional diagram illustrating a second embodiment of an optical waveguide module of the invention.

FIG. 6 shows a longitudinal cross-sectional diagram illustrating the second embodiment of the optical waveguide module of the invention.

Hereinafter, the second embodiment will be described, but the description will be mainly made based on the difference from the first embodiment, and the description of the same matter will be omitted. In addition, in FIG. 6, the above-described reference numerals will be given to the same components as those of the first embodiment, and detailed description thereof will be omitted.

An optical waveguide module 10 shown in FIG. 6 is the same as the first embodiment except for configurations of the through-hole 24.

The cross-sectional area of the through-hole 24 shown in FIG. 6 gradually increases as it becomes lower in the optical path between the light-emitting unit 31 of the light-emitting element 3 and the mirror 16.

A part of the sealing material 61 enters into the through-hole 24 similar to that of the first embodiment. The entered portion (inserted portion) is the lens 100. In the through-hole 24, the cross-sectional area in the depth direction varies. That is, when the depth of the sealing material 61 in the through-hole 24 is changed, the area of the lens 100 in the planar view is also changed. Therefore, this embodiment has an effect that the cross-sectional area of the lens 100 can be easily adjusted only by changing the depth of the sealing material 61 entered into the through-hole 24.

Figure 7:
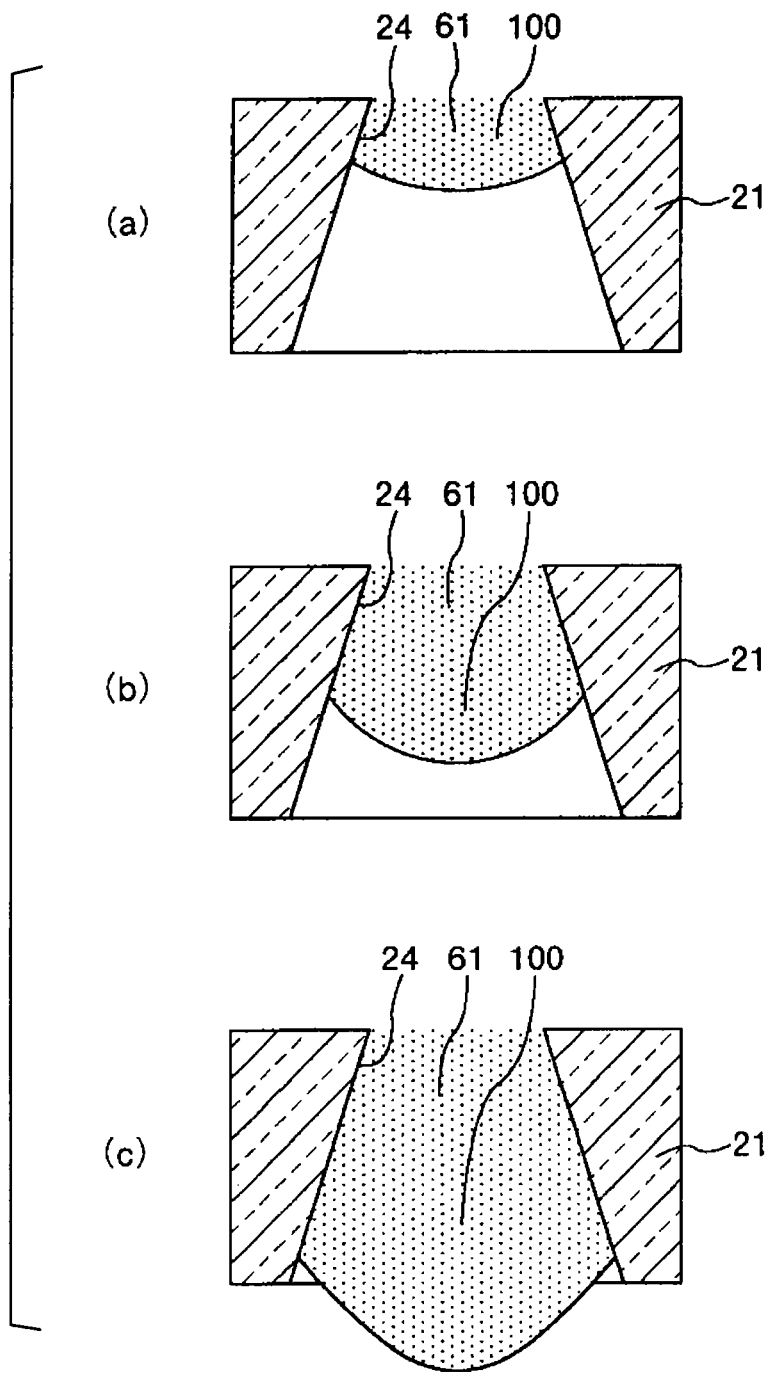
FIG. 7 is a longitudinal cross-sectional diagram illustrating another configuration example of the lens and the through-hole.
Figure 8:
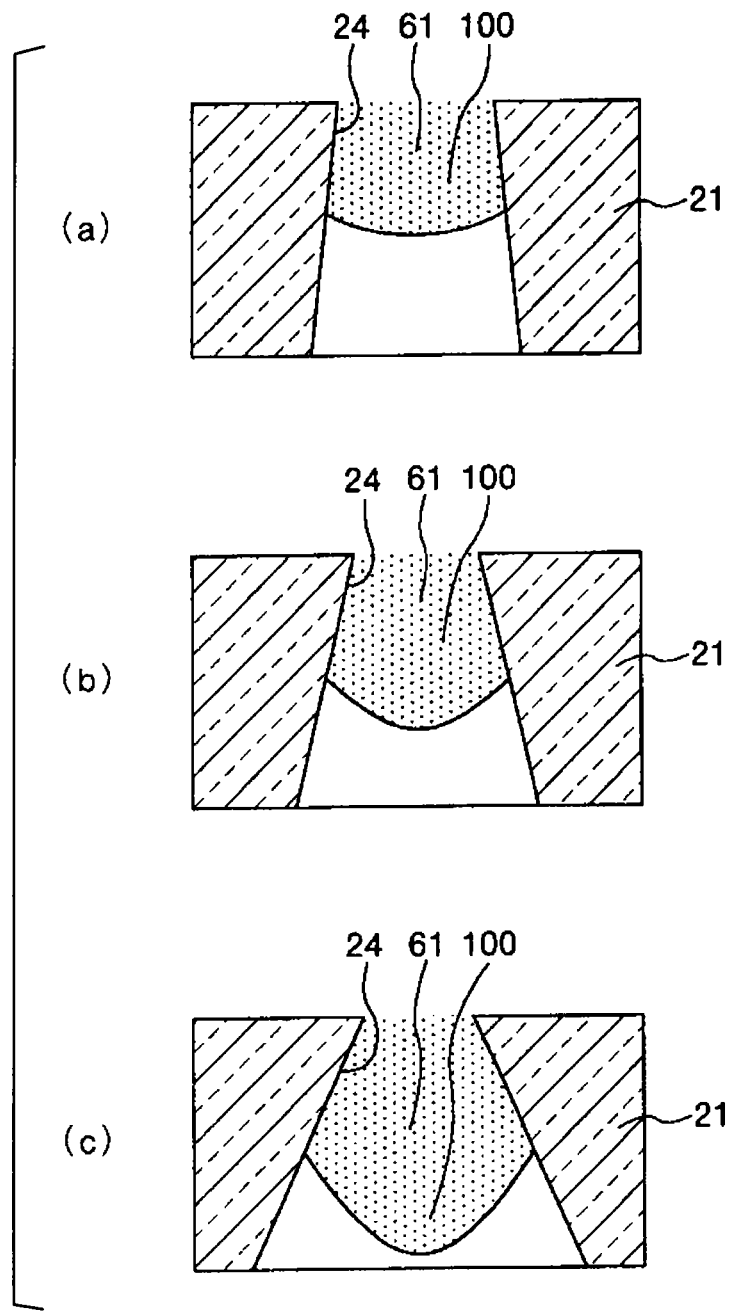
FIG. 8 is a longitudinal cross-sectional diagram illustrating another configuration example of the lens and the through-hole.

The lens 100 may have a cross-sectional shape in the longitudinal direction shown in FIGS. 7 and 8.

FIG. 7 is a longitudinal cross-sectional diagram illustrating another configuration example of the lens and the through-hole. Moreover, the lens and the through-hole shown in FIG. 7 are the same as those shown in FIG. 3 except for the following points.

The lens 100 shown in FIGS. 7(a), 7(b), 7(c) is positioned at a different depth in the through-hole 24, and the cross-sectional area of the lens is also different due to the difference in depth.

As explained above, the lens 100 can be produced by inserting the paste into the through-hole 24 and solidifying the paste inserted into the through-hole 24. Therefore, the larger the cross-sectional area of the lens 100, the more the paste falls. In other words, compared with the lens 100 shown in FIG. 7(a), the lens 100 shown in FIGS. 7(b) and 7(c) has a larger cross-sectional area, and a smaller radius of curvature. As a result, the lens 100 shown in FIGS. 7(b) and 7(c) has a shorter focal length compared with the lens 100 shown in FIG. 7(a).

As explained above, this embodiment has effects that the cross-sectional area of the lens 100 can be easily adjusted and the radius of curvature, that is, the focal length can be also easily adjusted only by changing the depth of the sealing material 61 inserted into the through-hole 24.

Moreover, in a case of FIG. 7 (c), it is only necessary to form an opening in the adhesive layer 5 at a point which corresponds to the through-hole 24. Thereby, it is possible to prevent the interference of the lens 100 by the adhesive layer 5.

FIG. 8 is a longitudinal cross-sectional diagram illustrating another configuration example of the lens and the through-hole. Moreover, the lens and the through-hole shown in FIG. 8 are the same as those shown in FIG. 3 except for the following points.

The through-hole 24 shown in FIGS. 8(a), 8(b), 8(c) has a different inclination angle of the inner wall relative to the optical path between the light-emitting unit 31 of the light-emitting element 3 and the mirror 16. Accordingly, the radius of curvature of the lens 100 provided in the through-hole 24 is different. This difference in the radius of curvature of the lens 100 is caused by the production method in which the lens 100 is formed by solidifying the paste material. In other words, the radius of curvature of the lens 100, that is, the focal length of the lens 100, can be easily adjusted only by adjusting the inclination angle of the inner wall of the through-hole 24.

Specifically, the larger the inclination angle of the inner wall of the through-hole 24 relative to the optical path, the shorter the radius of curvature and the focal length of the lens 100.

Figure 9:
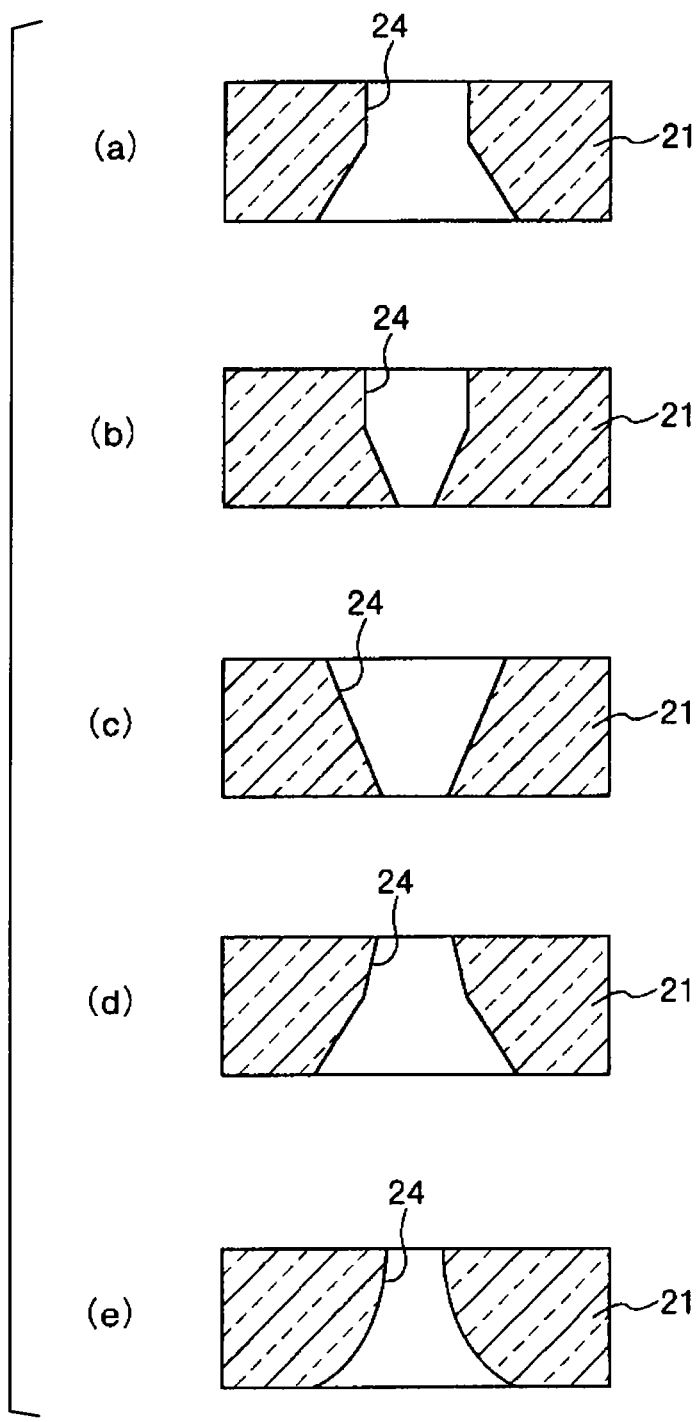
FIG. 9 is a longitudinal cross-sectional diagram illustrating another configuration example of the through-hole.

Moreover, the lens 100 may have a sectional shape in the longitudinal direction shown in FIG. 9.

FIG. 9 is a longitudinal cross-sectional diagram illustrating another configuration example of the through-hole. Moreover, the lens and the through-hole shown in FIG. 9 are the same as those shown in FIG. 6 except for the following points.

The through-hole 24 shown in FIGS. 9(a) and 9(b) is formed by combining a through-hole having a columnar shape and a through-hole having a circular truncated cone shape.

The through-hole 24 shown in FIG. 9(c) is a through-hole which is formed by inverting vertically the through-hole 24 shown in FIG. 6.

The through-hole 24 shown in FIG. 9(d) is formed by changing the inclination angle of the inner wall relative to the optical path in the depth direction in the through-hole 24 shown in FIG. 6.

The through-hole 24 shown in FIG. 9(e) is formed such that the cross-sectional area increases at an accelerated rate as it becomes lower.

When these through-holes 24 are used, it is possible to easily produce the lens for converging the signal light.

<Method for Producing Optical Waveguide>

Here, a method for producing the optical waveguide module explained above will be explained.

The optical waveguide module 10 as shown in FIG. 1 is produced by preparing the optical waveguide 1, the circuit board 2, the light-emitting element 3, the semiconductor element 4, and the sealing material 61 and 62, and mounting them.

Among these, the circuit board 2 is formed by forming a conductive layer so as to cover both surfaces of the insulating substrate 21, and removing (patterning) unnecessary portions to allow the conductive layer 22 and 23 including an interconnection pattern to remain.

Examples of a method of producing the conductive layer include a chemical deposition method such as plasma CVD, thermal CVD, and laser CVD, a physical deposition method such as vacuum deposition, sputtering, and ion plating, a plating method such as electrolytic plating and electroless plating, a thermal spraying method, a sol-gel method, an MOD method, and the like.

In addition, examples of a method of patterning the conductive layer include a method in which a photolithography method and an etching method are combined.

Then, one embodiment of a method for producing the optical waveguide will be explained below.

The optical waveguide 1 includes the laminate body (parent material) which is formed by laminating the support film 18, the clad layer 11, the core layer 13, the clad layer 12 and the cover film 19 in this order from a lower side; and the mirror 16 that is formed by removing a part of the laminated body.

Hereinafter, a description will be made by dividing the production method into [1] a process of forming a laminated body 1, and [2] a process of forming the mirror 16.

[1] In the laminated body (parent material) 1, three layers, that is, the clad layer 11, the core layer 13, and the clad layer 12 are formed by a method in which the clad layer 11, the core layer 13, and the clad layer 12 are sequentially formed or a method in which the clad layer 11, the core layer 13, and the clad layer 12 are formed in advance on base materials, respectively, the produced layers are peeled from the base substrates, and the layers are bonded to each other, and the like.

On the other hand, the support film 18 and the cover film 18 are adhered to the laminate including the three layers as explained above.

Each layer of the clad layer 11, the core layer 13, and the clad layer 12 is formed by applying a composition for forming each layer onto a base material to form a liquid phase film, by making the liquid phase film uniform, and by removing a volatile component.

Examples of the application method include a doctor blade method, a spin coat method, a dipping method, a table coat method, a spray method, an applicator method, a curtain coat method, a die coat method, and the like.

In addition, when removing the volatile component in the liquid phase film, a method in which the liquid phase film is heated, the liquid phase film is placed under a decompressed environment, or a dry gas is blown to the liquid phase film is used.

In addition, examples of the composition for forming each layer include a solution (a dispersed solution) that is obtained by dissolving or dispersing the constituent material of the clad layer 11, the core layer 13, or the clad layer 12 in various solvents.

Here, examples of a method of forming the core portion 14 and the side clad portions 15 of the core layer 13 include a photo-bleaching method, a photolithography method, a direct exposing method, a nano-imprinting method, a monomer diffusion method, and the like. According to these methods, a refractive index of a partial region of the core layer 13 is made to vary. Alternatively, when a composition of a partial region is made different, the core portion 14 having a relatively high refractive index and the side clad portions 15 having a relatively low refractive index can be obtained.

[2] Then, an excavation process of removing a part of the laminated body 1 on a lower surface side of the support film 18 is performed. An inner wall surface of a space (cavity) that is obtained by this process becomes the mirror 16.

The excavation process with respect to the laminated body 1 can be performed, for example, by a laser processing method, a dicing processing method using a dicing saw, or the like. In this way, the optical waveguide 1 is produced.

Figure 10:
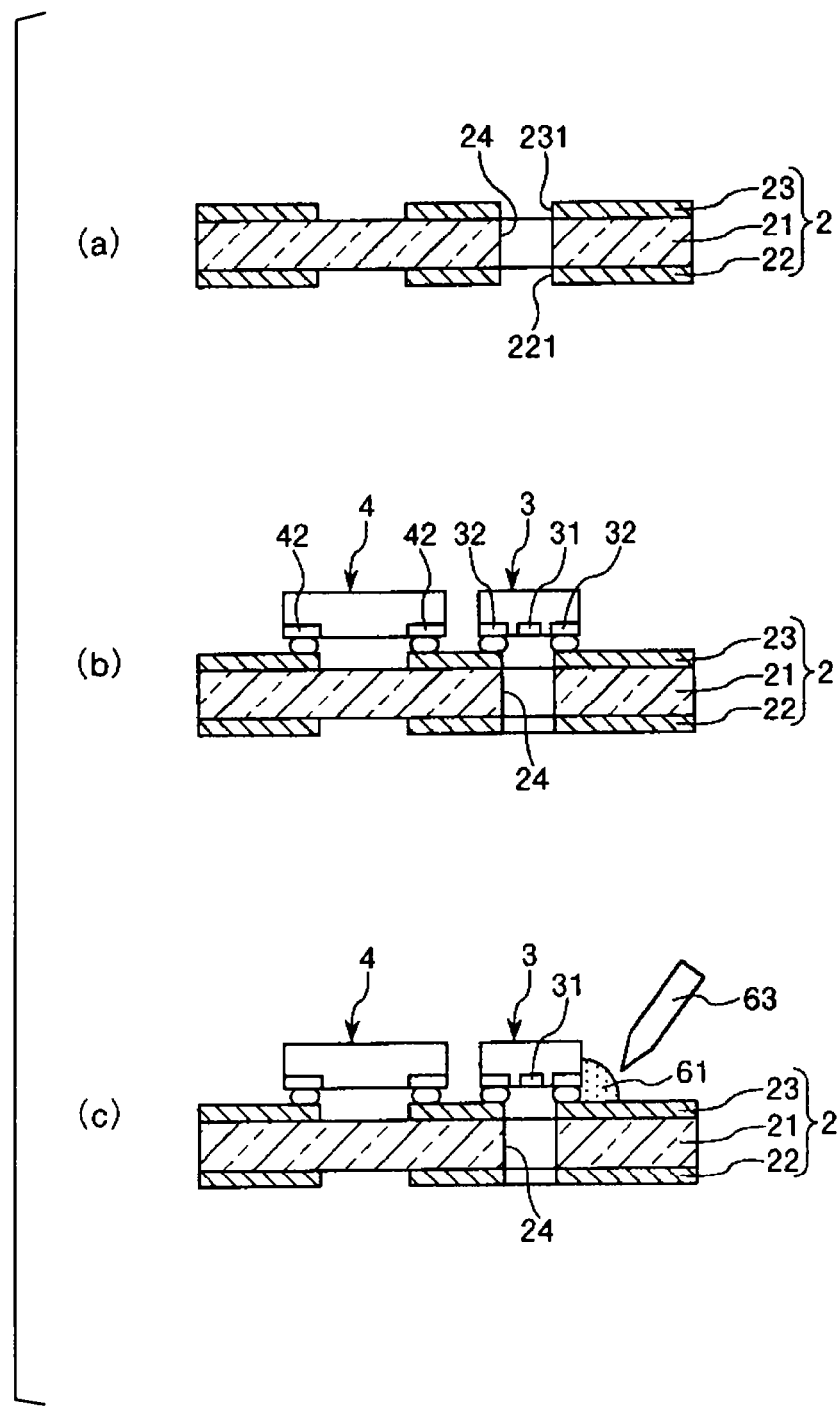
FIG. 10 is a schematic diagram (a longitudinal cross-sectional diagram) illustrating the method for producing the optical waveguide module shown in FIG. 2.
Figure 11:
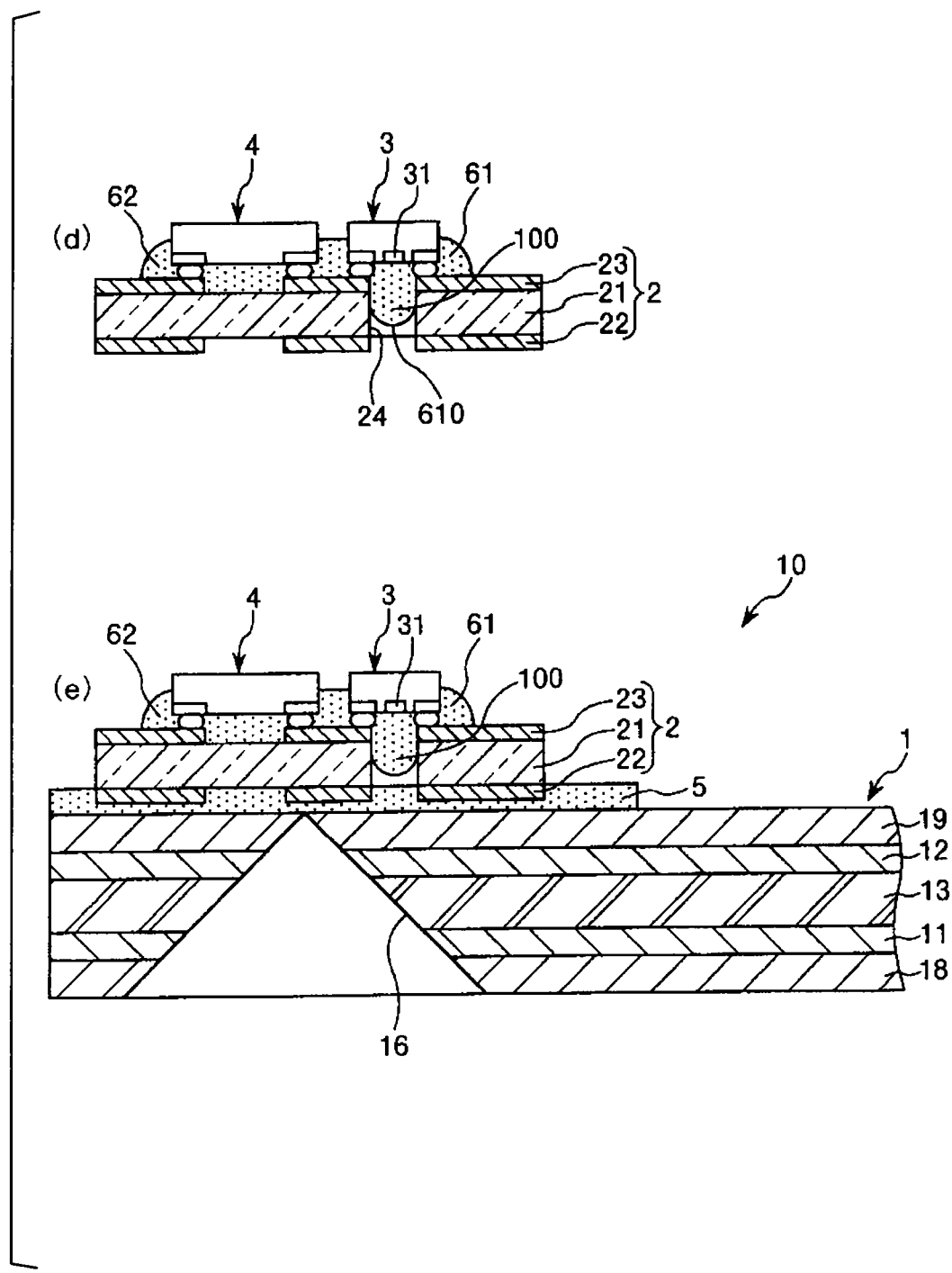
FIG. 11 is a schematic diagram (a longitudinal cross-sectional diagram) illustrating the method for producing the optical waveguide module shown in FIG. 2.
Figure 12:
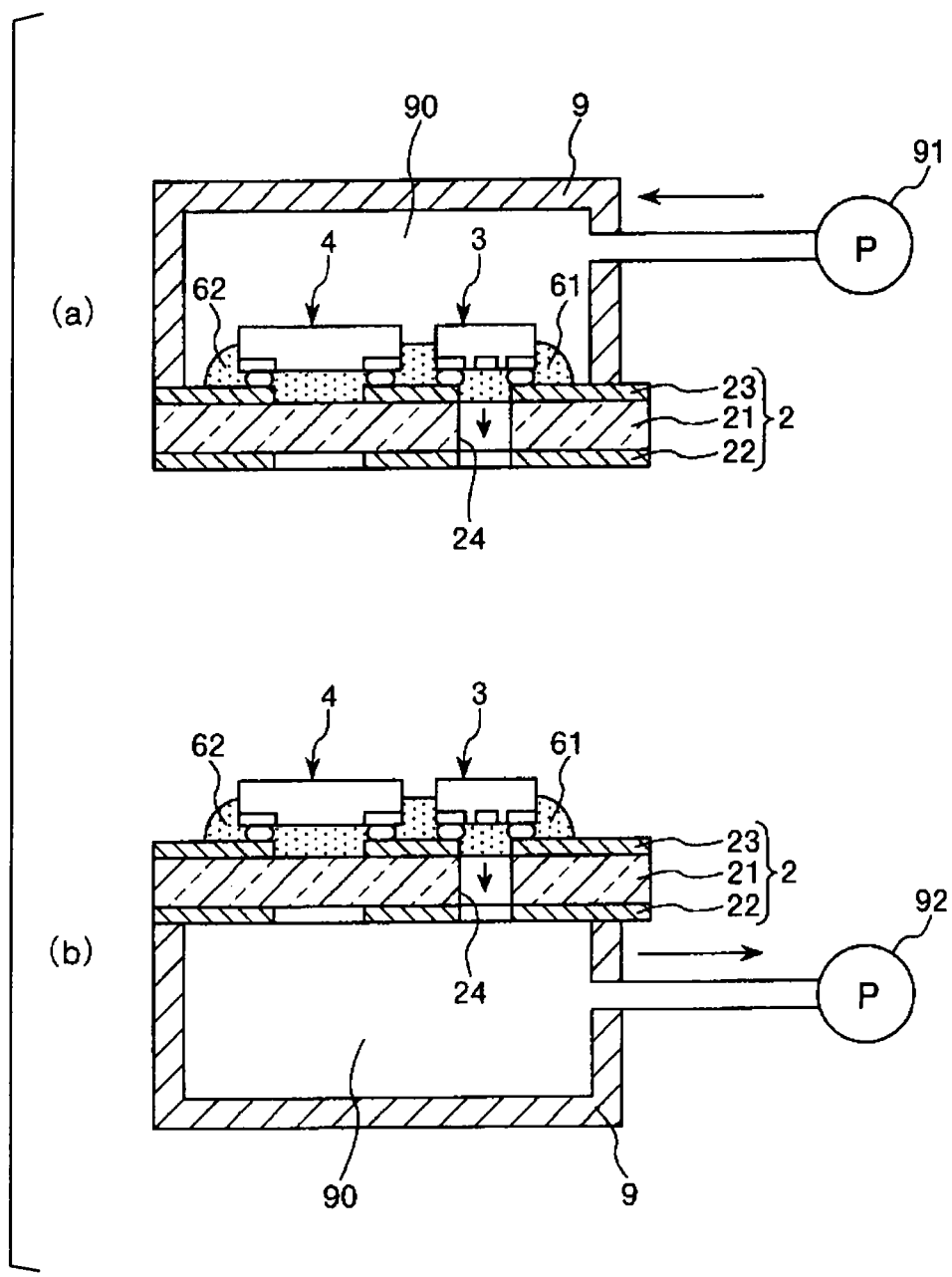
FIG. 12 is a schematic diagram (a longitudinal cross-sectional diagram) illustrating the method for producing the optical waveguide module shown in FIG. 2.

FIGS. 10 to 12 shows a schematic diagram (a longitudinal cross-sectional diagram) illustrating the method for producing the optical waveguide shown in FIG. 2.

Hereinafter, a description will be made by dividing the production method into [1] a process of mounting the light-emitting element 3 and the semiconductor element 4 on the circuit board 2, [2] a process of supplying the sealing material (filler) 61 and 62, [3] a process of inserting a part of the sealing material 61 into the through-hole 24, and solidifying, and [4] a process of adhering the circuit board 2 and the optical waveguide 1.

[1] First, the circuit board 2 is prepared. As explained above, the circuit board 2 includes the conductive layer 22 having the opening 221 and the conductive layer 23 having the opening 231. The insulating substrate 21 has the through-hole 24 so as to correspond to the openings 221 and 231 (FIG. 10(a)).

Then, the light-emitting element 3 and the semiconductor element 4 are mounted on the circuit board 2 (FIG. 10(b)).

Thereby, the electrode 32 of the light-emitting element 3 and the electrode 42 of the semiconductor element 4 and the conductive layer 23 are mechanically and electrically connected.

[2] Then, the paste sealing material 61 is supplied from a supplying unit 63, such as a dispenser, to a gap between the light-emitting element 3 and the circuit board 2. In addition, the paste sealing material 62 is also supplied in a gap between the semiconductor element 4 and the circuit board 2 (not shown in figures).

The viscosity of the sealing material 61 and 62 is not particularly limited. However, the viscosity of the sealing material 61 and 62 at room temperature is preferably in a range of 10 to 10,000 Pa·s, and more preferably in a range of 100 to 8,000 Pa·s. The sealing material 61 and 62 having the viscosity in the range has both excellent fluidity which is suitable for penetrating into the gap, and excellent shape retention for maintaining the fixed shape by surface tension, when the sealing material 61 and 62 is entered into the through-hole 24.

[3] The supplied sealing material 61 fills the opening 231, and a part of the supplied sealing material 61 flows into the through-hole 24. At this time, the sealing material 61, which is in contact with the inner wall of the through-hole 24, tries to stay there, naturally, and a curved surface 610 of which the center portion protrudes downwardly is formed. That is, since a part of the sealing material 61 which is near the inner wall of the through-hole 24 is pulled upwardly by surface tension, a part of the sealing material 61 which is far from the inner wall, that is, the center of the sealing material 61, protrudes downwardly relative to the part near the inner wall of the through-hole 24. Due to this, the curved surface 610 which is suitable for converging the signal light can be produced.

Then, the sealing material 61 and 62 is solidified. For example, the sealing material 61 and 62 is solidified by a thermal curing method, an optical curing method, or the like. Thereby, the lens 100 for converging the signal light which passes through the lens 100 is formed at a part of the sealing material 61.

[4] Then, the circuit board 2 is laminated on the optical waveguide 1 using an adhesive (FIG. 11 (a)). In this way, the optical waveguide 1 is produced with high efficiency.

Here, in the process [3], a method for introducing a part of the sealing material 61 into the through-hole 24 is not particularly limited. However, for example, a method in which the circuit board 2 is arranged such that the through-hole 24 is positioned vertically, and the sealing material 61 is introduced into the through-hole 24 due to its own weight, and a method in which the sealing material 61 is introduced into the through-hole 24 due to a capillary phenomenon of the through-hole 24 can be used. Since the sealing material 61 itself flows into the through-hole 24 without force in these methods, special devices are not necessary, and these methods are preferable. In addition, when the inside wall of the through-hole 24 is subjected to the lyophilic treatment, the flow of the sealing material 61 is promoted.

Moreover, the sealing material 61 may be introduced into the through-hole 24 due to its own weight and/or a capillary phenomenon.

In addition to these methods, a method for introducing the sealing material 61 with force, such as a method in which the sealing material 61 is introduced into the through-hole 24 with pressure from the upper side of the circuit board 2 (that is light-emitting element 3 side), a method in which the sealing material 61 is introduced into the through-hole 24 by sucking from the lower side of the through-hole 24 (that is, the opposite side to the light-emitting element 3), and a method which uses centrifugal force can also be used.

Among these methods, in the method for entering the sealing material 61 with pressure, a pressure difference is made between the upper side and the lower side of the circuit board 2, and the pressure at the upper side of the circuit board 2 is made higher. Specifically, as shown in FIG. 12 (a), a housing 9 for making an airtight space 90 is put on the circuit board 2, and a pressure pump 91 is connected to the housing 9 to apply pressure in the housing. When the inside of the housing 9 is pressurized by the pressure pump 91, the pressure difference between the inside and the outside of the housing 9 is released by the through-hole 24. In this case, the sealing material 61 is sucked into the through-hole 24 due to the release of the pressure difference. As a result, the curved surface 610 as explained above is formed. By this method, it is possible to produce reliably the curved surface 610 even when the sealing material 61 having a relatively high viscosity, and low fluidity is used. In addition, it is also possible to adjust the depth of the sealing material 61 in the through-hole 24 by adjusting the degree of pressure.

In addition, the sealing material 61 in the method in which the sealing material 61 is sucked from the lower side behaves similar to the sealing material 61 shown in FIG. 12(a). Specifically, as shown in FIG. 12(b), a housing 9 for making an airtight space 90 is put on the lower side of circuit board 2, and a decompression pump 92 for decreasing the pressure in the housing 9 is connected to the housing 9. When the inside pressure of the housing 9 is reduced by the decompression pump 92, the pressure difference between the inside and the outside of the housing 9 is released by the through-hole 24. In this case, the sealing material 61 is sucked into the through-hole 24 due to the release of the pressure difference. As a result, the curved surface 610 as explained above is formed. By this method, it is possible to produce reliably the curved surface 610 even when the sealing material 61 having a relatively high viscosity, and low fluidity is used. In addition, it is also possible to adjust the depth of the sealing material 61 in the through-hole 24 by adjusting the degree of pressure.

In order to control the shape of the curved surface 610, it is only necessary to perform at the same time or alternatively the process for introducing the sealing material 61 into the through-hole 24 (that is, pressurizing process and depressurizing process) and the process for solidifying the sealing material 61 (that is, heat-applying process, light-applying process, or the like). Thereby, the curved surface 610 having a desired shape can be obtained.

The pressure difference between the upper and lower surface of the through-hole 24 is not particularly limited in the two methods explained above. However, the pressure difference is preferably in a range of about 0.001 MPa to about 0.1 MPa, and more preferably in a range of about 0.005 MPa to 0.05 MPa. When the pressure difference is adjusted to the range, it is possible to introduce the sealing material 61 with an appropriate rate, and adjust the depth of the sealing material 61 in the through-hole 24.

Instead of the processes [2] and [3], it is possible to make a desired curved surface 610 by performing the following process [5].

[5] The paste sealing material 61 is supplied to the gap between the light-emitting element 3 and the circuit board 2 by the supplying unit 63 such as a dispenser. In addition, the paste sealing material 62 is supplied to the gap between the semiconductor element 4 and the circuit board 2, which is not shown in figures.

The viscosity of the sealing material 61 and 62 is not particularly limited. However, the viscosity of the sealing material 61 and 62 at room temperature is preferably in a range of 1 to 100,000 Pa·s, and more preferably in a range of 5 to 50,000 Pa·s.

The sealing material 61 fills the opening 231, and a part of the sealing material 61 flows into the through-hole 24, and reaches the opposite side to the component side of the light element.

Then, a die processed with a lens shape is positioned such that the position of a mold surface of the die is matched with the opening 231. After that, the sealing material 61 and 62 is solidified. For example, the sealing material 61 and 62 is solidified by a heat solidification method, or light solidification method. After solidification, the die is removed. Thereby, the lens 100 for converging the signal light passing through the lens 100 can be formed at a part of the sealing material.

Among these methods, a suitable method is selected depending on various conditions such as the viscosity of the sealing material 61 and 62, the size of the gap between the circuit board 2 and the light-emitting element 3, the cross-sectional area of the through-hole 24, and the like.

For example, when the viscosity of the sealing material 61 is low, the gap between the circuit board 2 and the light-emitting element 3 is large, or the cross-sectional area of the through-hole 24 is large, it is possible to use the method in which the sealing material 61 is introduced into the through-hole 24 with force. However, the method in which the sealing material 61 is introduced without force into the through-hole 24 is preferably used.

On the other hand, when the viscosity of the sealing material 61 is high, the gap between the circuit board 2 and the light-emitting element 3 is small, or the cross-sectional area of the through-hole 24 is small, it is preferable to use the method in which the sealing material 61 is introduced into the through-hole 24 with force.

In addition, it is also possible to combine two or more the methods explained above.

<Electronic Apparatus>

An electronic apparatus (an electronic apparatus of the invention), which is provided with the optical waveguide module of the invention, is applicable to any electronic apparatus that performs a signal processing between an optical signal and an optical signal, but the electronic apparatus is preferably applicable to electronic apparatuses such as a router apparatus, a WDM apparatus, a cellular phone, a gaming machine, a PC, a television, and a home server. In all of these electronic apparatuses, it is necessary to perform transmission of high-capacity data at a high speed between a calculation apparatus such as an LSI and a storage apparatus such as a RAM. Accordingly, when these electronic apparatuses are provided with the optical waveguide module of the invention, problems such as noise, signal deterioration, and the like, which are unique to an electrical interconnection, are solved. As a result, a significant improvement in performance thereof can be expected.

Furthermore, an amount of heat generation at the portion of the optical waveguide is reduced greatly compared to the electrical interconnection. Accordingly, a degree of integration in the substrate increases and thus a decrease in size is realized. In addition, electric power that is necessary for cooling can be reduced, and entire power consumption of the electronic apparatus can be reduced.

Hereinbefore, embodiments of the optical waveguide module of the invention, the method for producing the optical waveguide module, and the electronic apparatus have been described. However, the invention is not limited thereto, and for example, the respective components, which construct the optical waveguide module, can be substituted with arbitrary components capable of exhibiting the same function. In addition, an arbitrary constituent can be added, and the plurality of embodiments can be combined with each other.

In addition, in the respective embodiments, the number of channels (core portion) provided to the optical waveguide 1 is one, but in the optical waveguide module of the invention, the number of channels can be two or more. In this case, the number of mirrors, structure bodies, light-emitting elements, and the like can be set according to the number of channels. In addition, with regard to the light-emitting element and the light-receiving element, an element including a plurality of light-emitting units or a plurality of light-receiving units can be used.

INDUSTRIAL APPLICABILITY

According to the present invention, it is possible to reduce the optical coupling loss between the optical element and the optical waveguide by providing the lens between the optical element and the optical waveguide. Therefore, it is possible to produce an optical waveguide module which has a high S/N ratio and can perform high-quality optical communication.

In addition, it is also possible to produce an excellent optical waveguide module with high efficiency.

Furthermore, it is also possible to provide an electronic apparatus which can perform high-quality optical communication.

REFERENCE SIGNS LIST

1: Optical waveguide
10: Optical waveguide module
11: Clad layer (first clad layer)
12: Clad layer (second clad layer)
13: Core layer
14: Core portion
15: Side clad portion
16: Mirror
18: Support film
19: Cover film
2: Circuit board
20: Connector
21: Insulating substrate
22, 23: Conductive layer
221, 231: Opening
24: Through-hole
241: Liquid-repellant area
3: Light-emitting element
31: Light-emitting unit
32: Electrode
4: Semiconductor device
42: Electrode
5: Adhesive layer
61, 62: Sealing material
63: Supplying unit
610: Curved surface
7: Light-receiving element
71: Light-receiving unit
9: Housing
90: Airtight space
91: Pressure pump
92: Pressure reduction pump
100: Lens

The invention claimed is:

1. An optical waveguide module, comprising:
an optical waveguide including a core portion and a clad portion covering the core portion;

an optical element positioned over the clad portion of the optical waveguide;

a circuit board positioned between the optical waveguide and the optical element and having a through-hole formed along an optical path connecting the optical element and the core portion of the optical waveguide; and a sealing component formed in a gap between the optical element and the circuit board and having a lens portion formed in the through-hole such that the lens portion of the sealing component is configured to converge signal light passing though the optical path to a focal point, wherein the optical waveguide has an optical path-converting portion configured to covert an optical path formed in the core portion of the optical waveguide to the optical path connecting the optical element and the core portion of the optical waveguide.

2. The optical waveguide module according to claim 1, wherein the lens portion of the sealing component has a convex curve protruding toward the optical waveguide.

3. The optical waveguide module according to claim 1, wherein the sealing component is made of a resin material.

4. The optical waveguide module according to claim 1, wherein the lens portion of the sealing component is configured to form the focal point which is positioned in at least one of the optical path-converting portion and a light-receiving-and-emitting unit of the optical element.

5. An electronic apparatus comprising the optical waveguide module according to claim 1.

6. The optical waveguide module according to claim 2, wherein the sealing component is made of a resin material.

7. The optical waveguide module according to claim 2, wherein the lens portion of the sealing component is configured to form the focal point which is positioned in at least one of the optical path-converting portion and a light-receiving-and-emitting unit of the optical element.

8. The optical waveguide module according to claim 3, wherein the lens portion of the sealing component is configured to form the focal point which is positioned in at least one of the optical path-converting portion and a light-receiving-and-emitting unit of the optical element.

9. The optical waveguide module according to claim 6, wherein the lens portion of the sealing component is configured to form the focal point which is positioned in at least one of the optical path-converting portion and a light-receiving-and-emitting unit of the optical element.

10. The optical waveguide module according to claim 1, wherein the optical path-converging portion of the optical waveguide is formed along the optical path in the core portion.

11. The optical waveguide module according to claim 1, wherein the optical path-converging portion of the optical waveguide is formed on an extended line of the optical path in the core portion.

12. The optical waveguide module according to claim 1, wherein the optical path-converting portion is a mirror portion comprising an inner wall surface of a cavity formed in the optical waveguide.

13. The optical waveguide module according to claim 1, wherein the optical waveguide comprises cyclic ether-based resin.

14. The optical waveguide module according to claim 1, wherein the optical waveguide comprises norbornene-based resin.

15. The optical waveguide module according to claim 1, wherein the optical wave guide comprises a plurality of clad layers and a core layer laminated between the clad layers such that the core portion is formed in the core layer and the clad portion is formed in the clad layers and the core layer.

16. The optical waveguide module according to claim 1, wherein the through-hole formed in the circuit board has an inner wall having an inclination angle formed relative to the optical path connecting the optical element and the core portion of the optical waveguide.

17. The optical waveguide module according to claim 1, further comprising:
an adhesive layer adhering the circuit board to the optical waveguide.

18. A method for producing an optical waveguide module, comprising:
mounting an optical element on a surface of a circuit board having a through-hole;
supplying a paste sealing material in a gap between the optical element and the circuit board such that the paste sealing material is introduced into the through-hole formed in the circuit board; and
solidifying the paste sealing material introduced in the gap and into the through-hole such that a sealing component having a lens portion in the through-hole is formed,
wherein the optical element is positioned over a clad portion of an optical waveguide which includes a core portion and the clad portion covering the core portion, the circuit board is positioned between the optical waveguide and the optical element and has the through-hole formed along an optical path connecting the optical element and the core portion of the optical waveguide, the sealing component has the lens portion formed in the through-hole such that the lens portion of the sealing component is configured to converge signal light passing though the optical path to a focal point, and the optical waveguide has an optical path-converting portion configured to covert an optical path formed in the core portion of the optical waveguide to the optical path connecting the optical element and the core portion of the optical waveguide.

19. The method for producing an optical waveguide module according to claim 18, wherein the paste sealing material is introduced into the gap such that the paste sealing material is introduced into the through-hole by capillarity of the through-hole.

20. The method for producing an optical waveguide module according to claim 18, wherein the paste sealing material is introduced into the gap such that the paste sealing material is introduced into the through-hole by a pressure difference between the ends of the through-hole.

* * * * *